(12) United States Patent
Lakshmanan et al.

(10) Patent No.: US 9,996,068 B2
(45) Date of Patent: Jun. 12, 2018

(54) INTELLIGENT WIRELESS AND WIRED CONTROL OF DEVICES

(71) Applicants: Ramasamy Lakshmanan, Milpitas, CA (US); Chandrasekhar Esakkimuthu Poorna, San Jose, CA (US)

(72) Inventors: Ramasamy Lakshmanan, Milpitas, CA (US); Chandrasekhar Esakkimuthu Poorna, San Jose, CA (US)

( * ) Notice: Subject to any disclaimer, the term of this patent is extended or adjusted under 35 U.S.C. 154(b) by 198 days.

(21) Appl. No.: 15/016,891

(22) Filed: Feb. 5, 2016

(65) Prior Publication Data

US 2016/0231721 A1 Aug. 11, 2016

Related U.S. Application Data

(60) Provisional application No. 62/112,472, filed on Feb. 5, 2015.

(51) Int. Cl.
| | |
|---|---|
| *G05B 15/02* | (2006.01) |
| *G05B 19/00* | (2006.01) |
| *G05B 19/042* | (2006.01) |
| *H01H 71/00* | (2006.01) |

(52) U.S. Cl.
CPC ........... *G05B 19/042* (2013.01); *H01H 71/00* (2013.01); *G05B 15/02* (2013.01); *G05B 2219/2642* (2013.01)

(58) Field of Classification Search
CPC ...... H02J 3/14; H02J 2003/143; G05B 15/02; G06F 1/26; G06F 1/3203
USPC .......................... 700/286, 295, 297, 291, 292
See application file for complete search history.

(56) References Cited

U.S. PATENT DOCUMENTS

| | | | | |
|---|---|---|---|---|
| 6,018,449 | A * | 1/2000 | Nelson ................. | H02H 1/0092 361/64 |
| 7,657,763 | B2 * | 2/2010 | Nelson ................ | H02J 13/0013 323/234 |
| 2013/0041519 | A1* | 2/2013 | Feldstein .................. | H02J 3/14 700/297 |
| 2016/0358722 | A1 | 12/2016 | Lakshmanan et al. | |

* cited by examiner

*Primary Examiner* — Michael J Brown
(74) *Attorney, Agent, or Firm* — Bowen Liu; David Lewis

(57) ABSTRACT

A system is provided in which a microcontroller is connected to a household unit, which is controlled by the microcontroller. The microcontroller is connected to wireless unit, so that the household unit may be controlled wirelessly (e.g. from a smart phone, tablet computer, laptop, and/or personal computer). In an embodiment, the household unit is a circuit breaker or a bank of circuit breakers that protect various devices in the house from faults in the power lines. In an embodiment, the household unit includes a switch, such as a solenoid for turning off an electrical appliance. In an embodiment, the household unit has various settings that may be set remotely, via sending wireless signals to the microcontroller.

17 Claims, 15 Drawing Sheets

US 9,996,068 B2

INTELLIGENT WIRELESS AND WIRED CONTROL OF DEVICES

CROSS-REFERENCE TO RELATED APPLICATIONS

This application claims priority benefit of U.S. Provisional Patent Application No. 62/112,472, entitled "INTELLIGENT WIRELESS AND WIRED-LINE CONTROL OF DEVICES," filed on Feb. 5, 2015, by Ramasamy Lakshmanan et al., which is incorporated herein by reference.

FIELD

This specification generally relates to wireless and wired control of appliances.

BACKGROUND

The subject matter discussed in the background section should not be assumed to be prior art merely as a result of its mention in the background section. Similarly, a problem and the understanding of the causes of a problem mentioned in the background section or associated with the subject matter of the background section should not be assumed to have been previously recognized in the prior art. The subject matter in the background section may merely represent different approaches, which in and of themselves may also be inventions.

Thermostats, circuit breakers, furnaces, air conditioners, household appliances are well known. However, this specification recognizes that operating these appliances in the home can sometimes be confining.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION

Although various embodiments of the invention may have been motivated by various deficiencies within the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

The embodiments mentioned in this specification may incorporate the whitepaper in the Appendix.

In general, at the beginning of the discussion of each of FIGS. 1-9B is a brief description of each element. After the brief description of each element, each element is further discussed, usually in numerical order, but there is no one location where all of the information of any element of FIGS. 1-11 is necessarily located. Unique information about any particular element or any other aspect of any of FIGS. 1-11 may be found in, or implied by, any part of the specification.

Figure 1:
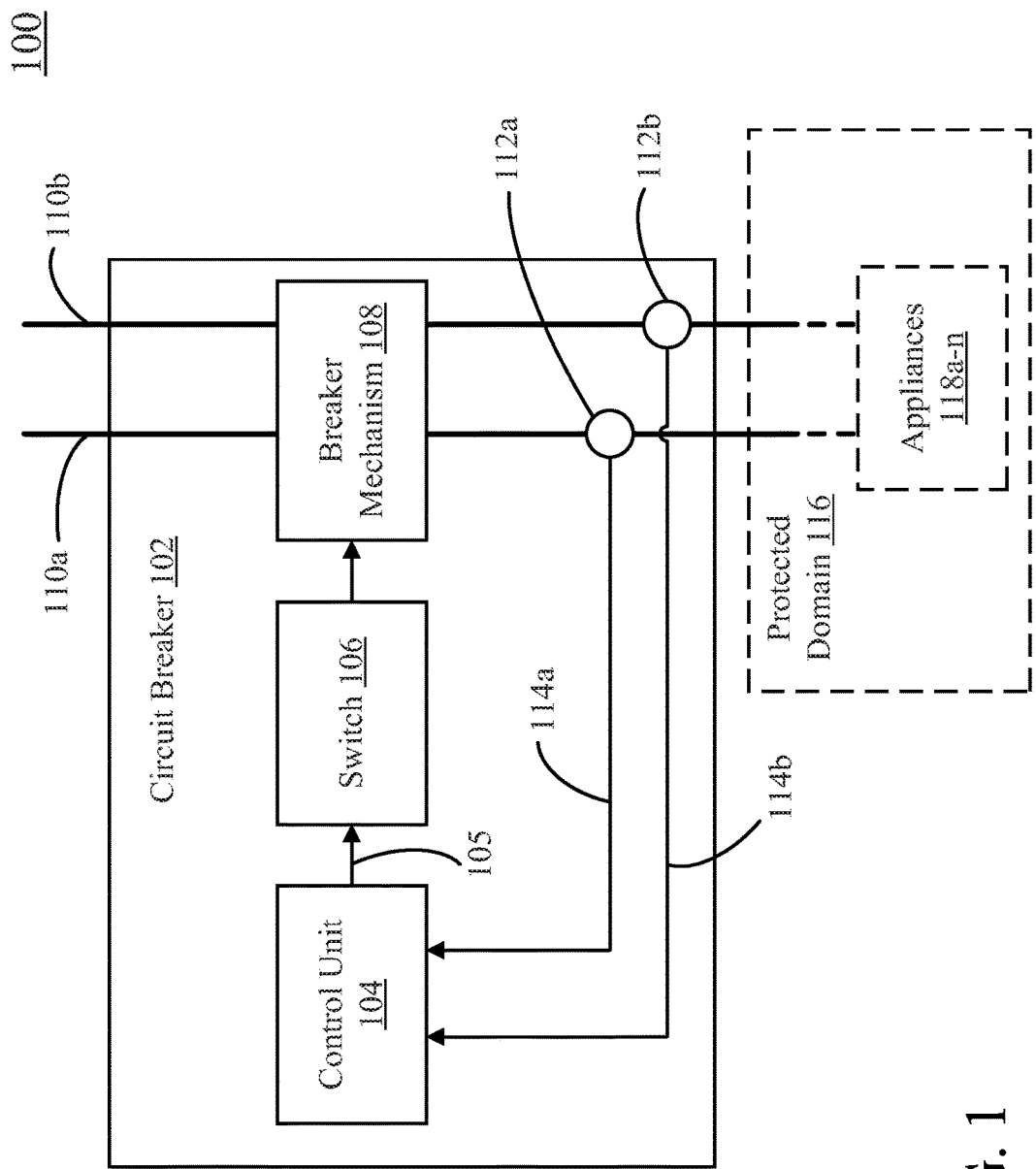
FIG. 1 shows a block diagram of an embodiment of a circuit breaker system.

FIG. 1 shows a block diagram of an embodiment of a circuit breaker system 100. The circuit breaker system 100 includes at least a circuit breaker 102, a control unit 104, a control signal 105, a switch 106, a breaker mechanism 108, main power lines 110a and 110b, load sensors 112a and 112b, sensing signals 114a and 114b, a protected domain 116, and appliances 118a-n. In other embodiments, the circuit breaker system 100 may not include all of the components listed and/or may include other components in addition to or instead of those listed above.

FIG. 1 shows an embodiment of a circuit breaker system 100 that is configured to detect a fault condition and in response interrupt current flow. In at least one embodiment, the circuit breaker system 100 includes a control unit that receives sensing signals and/or fault signals and controls a switch that turns off a breaker mechanism, and thereby disconnects the power lines, so as to protect the appliances from damage caused by overload or short circuit.

Circuit breaker 102 is an automatically operated electrical switch designed to protect an electrical circuit from damage caused by overload or short circuit. Some functions of the circuit breaker include detecting a fault condition and interrupting current flow (e.g., interrupting current flow when overload or short circuit is detected). The circuit breaker 102 includes a control unit that may actuate a switch that turns off a breaker mechanism.

Control unit 104 is a unit/module that is configured to monitor the status of the electrical power system and control the switch that turns off the breaker mechanism and thereby disconnects electrical loads from the power source. In at least one embodiment, the control unit 104 (or trip unit) senses the current drawn by a downstream electrical load/appliance using a load/current sensor(s), and then compares the current sensed to a rated value/range (e.g., in fixed settings or programmable settings) to determine if the current sensed is higher than the rated value (or higher than an upper threshold of the rated range). If the sensed current is higher than the rated value/threshold, the control unit 104 sends a control signal to the switch to turn off the breaker mechanism, thus disconnecting the appliance(s) from the power source and protecting the appliances/equipments. Throughout this specification, the terms "control unit," "control module," "trip unit," and "solid state trip unit" are used interchangeably, and may be substituted one for another to obtain different embodiments. Throughout this specification, the terms "load," "electrical load," "appliance," and "device" are used interchangeably, and may be substituted one for another to obtain different embodiments. In an alternative embodiment, the control unit 104 may be configured to turn on the power, by switching the safe of the breaker mechanism automatically or in response to control instructions after being turned off (or remotely at the instructions of the user), when it is determined to be safe to turn on the power back on.

Control signal 105 is a signal that is sent by the control unit 104 to actuate the switch. In an embodiment, when a fault condition is detected, the control signal 105 actuates the switch to turn off the breaker mechanism and disconnect the power lines. Throughout this specification, the terms "control signal," "trip signal," and "control/trip signal" are used interchangeably, and may be substituted one for another to obtain different embodiments.

Switch 106 is an electrical switch that controls automatic operation of the breaker mechanism and thereby controls the connection and disconnection of the power lines. In an embodiment, the switch 106 includes a magnetic latch (e.g., a solenoid) that may be actuated by the current flow through the coil of the switch 106, causing a state change of the breaker mechanism. In another embodiment, the switch 106 may include a relay that may be controlled by the current flow through the coil of the relay to change the position/state of the relay. In this specification, the terms "circuit breaker," "switch," "electrical switch," "magnetic latch," "solenoid," "solid state relay," and "relay" are used interchangeably, and may be substituted one for another to obtain different embodiments. In at least one embodiment, the switches in this specification may include, but are not limited to, transistors (and/or other semiconductor switches or threshold devices), electromagnetic switches, current switches, and/or voltage switches.

Breaker mechanism 108 includes one or more automatically and/or manually controllable switches that can connect or disconnect the power supply to electrical loads/appliances. In at least one embodiment, automatic operations of the breaker mechanism 108 are controlled by the switch 106 that is actuated by the control unit 104, and thereby connect/disconnect the power lines.

Main power lines 110a and 110b carry electrical power from a power source to one or more appliances. In at least one embodiment, the connection and disconnection of the power lines 110a and 110b are controlled by the circuit breaker 102.

Load sensors 112a and 112b include at least current/voltage sensors that measure the current/voltage to the appliances. Throughout this specification, the terms "load sensors," "current sensors," "current/voltage sensors," and "sensors" are used interchangeably, and may be substituted one for another to obtain different embodiments. In an embodiment, the circuit breaker system 100 may include other sensors for detecting fault conditions in the electrical system or detecting safety hazard. For example, the circuit breaker system 100 may include a sensor circuitry for ground fault detection and/or arc fault detection, and the circuit breaker 102 may disconnect/trip the circuit when ground fault and/or arc fault are detected. In another example, the circuit breaker system 100 may receive data from safety devices such as smoke/CO2/fire detectors.

Sensing signals 114a and 114b are signals carrying current/voltage data sensed by the load sensors 112a and 112b. In an embodiment, the sensing signals 114a and 114b include analog data that is then converted to digital signals to be processed by the control unit 104.

Protected domain 116 is a domain including electrical loads and circuits that are protected by the circuit breaker 102 from damage caused by overload, short circuit, and/or other fault conditions.

Appliances 118a-n include electronic appliances/devices that are connected to the main power lines 110a and 110b and consumes electric power provided by a power source.

Figure 2A:
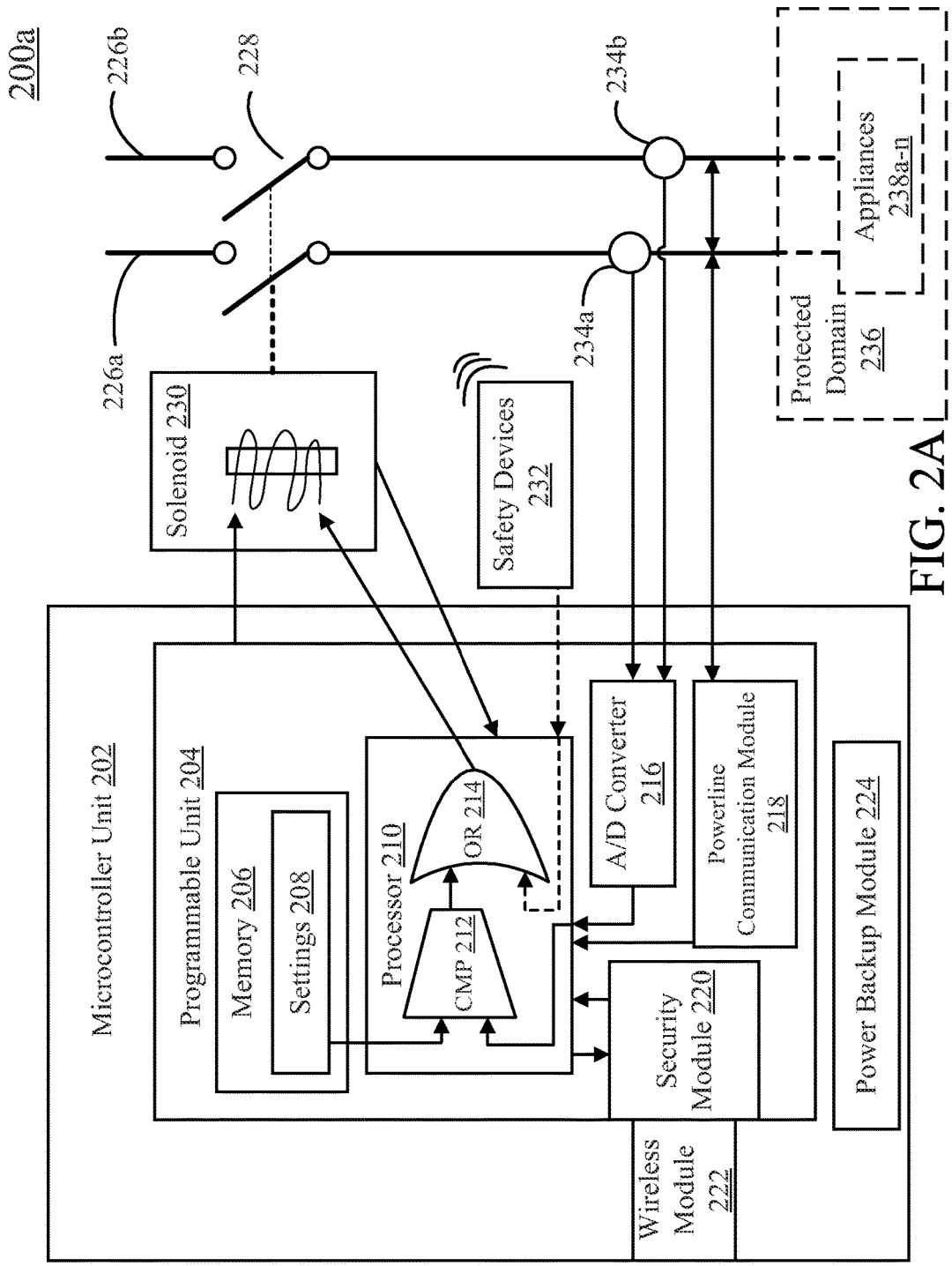
FIG. 2A shows a block diagram of an embodiment of an intelligent circuit breaker in which a circuit breaker is controlled by a microcontroller.

FIG. 2A shows a block diagram of an embodiment of an intelligent circuit breaker 200a controlled by a microcontroller. The intelligent circuit breaker 200a includes at least a microcontroller unit 202, a programmable unit 204, a memory 206, settings 208, a processor 210, compare function (CMP) 212, OR function (OR) 214, an analog-to-digital (A/D) converter 216, a powerline communication module 218, a security module 220, a wireless module 222, a power backup module 224, power lines 226a and 226b, a switch 228, a solenoid 230, safety devices 232, load sensors 234a and 234b, the protected domain 236, and appliances 238a-n. In other embodiments, the intelligent circuit breaker 200a may not include all of the components listed and/or may include other components in addition to or instead of those listed above.

FIG. 2A shows an embodiment of components in the intelligent circuit breaker 200a. In at least one embodiment, the intelligent circuit breaker 200a includes a microcontroller that controls the switch/breaker mechanism based on signals/data received at the microcontroller.

Microcontroller unit 202 is a microcontroller that controls a plurality of modules and/or components in the intelligent circuit breaker 200a. In an embodiment, the microcontroller unit 202a is a Wireless Microcontroller (WMC) unit that may replace (or be used as) the control unit 104 of FIG. 1 to control the switch 106 to turn off the breaker mechanism 108. In an embodiment, the microcontroller unit 202 may be controlled by user devices via wireless communications (e.g., Wi-Fi, Wireless Local Area Network (WLAN), Bluetooth, Near Field Communication (NFC)). In at least one embodiment, the microcontroller unit 202 may receive signals/data from sensors via wireless communication, wired communication, and/or Ethernet Over Powerline (EOP).

Programmable unit 204 includes programmable components/modules in the microcontroller unit 202 that may receive user settings. In at least one embodiment, the programmable unit 204 is configured to receive user instructions and set settings for the rated value/range of the current that the programmable unit is intended for. In at least one embodiment, the programmable unit 204 receives on-the-fly current/voltage values, which are measured by the load sensors and converted by an Analog-to-Digital Convertor (ADC). The programmable unit 204 compares the value of sensed current/voltage to the rated current/voltage (or current/voltage ranges) and issues appropriate control signals to the switch to open the circuit and disconnect the appliances from the power source if the current/voltage reaches an unsafe range. The programmable unit 204 may also receive continuous over-the-air (e.g., wireless) signals from safety devices, such as smoke/$CO_2$/fire detectors. In an embodiment, the programmable unit 204 includes algorithms to process instructions to break and connect the current path of power lines based on the input from the safety devices. Optionally, the current/voltage and/or status of the safety devices may be transmitted to a user device and displayed to the user. For example, the programmable unit 204 may send wireless signals to a user device, which displays, based on the signals, working status of the intelligent circuit breaker 200a, sensed current/voltage value, current settings, and/or status of safety devices. In an embodiment, the user may use the user device to communicate and control the programmable unit 204. For example, after the programmable unit 204 automatically disconnects an appliance from the power source, the user device with appropriate access may send instructions to the programmable unit 204 to force the appliance to be connected (e.g., by forcing the switch to turn on the breaker mechanism). In an embodiment, the user can only force the circuit to close, if the fault condition (e.g., the overcurrent) is no longer present and it is safe to close the circuit.

Memory 206 may include, for example, any one of, some of, any combination of, or all of a long term storage system, such as a hard drive; a short term storage system, such as random access memory and/or flash memory; and/or a removable storage system, such as a floppy drive or a removable drive. Memory system 206 may include one or more machine-readable mediums that may store a variety of different types of information. The term "machine-readable medium" is used to refer to any non-transitory medium capable of carrying information that is readable by a machine (e.g., a computer-readable medium). In at least one embodiment, the memory 206 includes fixed settings and/or programmable settings that are used by a processor to control the intelligent circuit breaker 200a.

Settings 208 may include one-time fixed settings and/or settings that are programmable based on user input. In an embodiment, the settings 208 include rated values/range of the current/voltage of the power. In an embodiment, the settings 208 include one-time settings that are hardwired by the manufacturer for security reasons. For example, the settings 208 may include settings that can only be programmed once, by the manufacturer, to a rated value/range. The use of one-time settings prevents a layman user (e.g., the end user) from picking a set of values that may cause a safety hazard. In an embodiment of settings 208 being programmable, changes to the programmable settings of rated value/range need a secure access that is only provided to a manufacturer or select users, such as installers, builders, and electricians, for example. Alternatively or additionally, a layman user is given access that allows the layman user to observe values and program the settings 208 only below and up to the maximum rated values/threshold of the circuit breaker 200a as set by the manufacturer or select users.

Processor 210 is a processor that controls the circuit breaker 200a. Optionally, processor 210 controls and/or verifies access to the settings of circuit breaker 200a. In an embodiment, the processor 210 is connected to the memory 206 and/or other memories. In an embodiment, the processor 210 is a microprocessor of the microcontroller unit 202. In at least one embodiment, the processor 210 receives signals from sensors and/or safety devices, processes and analyzes the signals, and accordingly controls the switch/breaker mechanism.

Compare function (CMP) 212 is a function for the processor 210 to compare two or more values. In at least one embodiment, CMP 212 is used by the processor 210 to compare sensed current/voltage value with a rated value/range. If the sensed value is above the rated value or upper threshold of the rated range, CMP 212 outputs a signal to indicate a fault condition.

OR function (OR) 214 is a function for the processor 210 to determine whether to output a signal based on either a fault condition is signaled at CMP 212 or a safety device. In at least one embodiment, OR 214 is used by the processor 210 to send a signal to actuate the switch if either a fault signal is received from CMP 212 or a fault condition is detected by a safety device. In an alternative embodiment, CMP 212 may be a comparator (e.g., an operational amplifier configured as a comparator) and OR 214 may be a logical OR circuit.

Analog to digital (A/D) converter 216 converts analog signals received from the load sensors (which may be current sensors) to digital values and provides the digital values to the programmable unit 204 to compare with the rated value/range. In an alternative embodiment, the current/voltage sensed is compared via CMP 212 to a reference value (e.g., a reference voltage and/or current) without converting the analog current/voltage to a digital value.

Powerline communication module 218 is a module that facilitates use of existing power lines as a media to communicate with other devices/appliances. In at least one embodiment, the powerline communication module 218 may facilitate use of existing powerline communication protocols to determine the status and control sensor modules (e.g., a standalone wireless sensors and/or power-line based sensors), which may be placed closer to appliances that need to be protected. For example, the sensor modules may be placed as close as is practical to the appliance that needs to be protected. In an embodiment, placing a standalone wireless/powerline sensor close to appliances that need to be protected allows for redundancy in cases of failure of the wireless network. In an embodiment, the powerline communications maybe used as a backup communication channel in case wireless network fails.

Security module 220 is a module that controls access to the programmable functions of the programmable unit 204 to prevent unauthorized access. In an embodiment, the security module 220 verifies the identity of the user and determines whether the user has authentication to access the programmable unit 204. In at least one embodiment, the security module 220 limits the access of authenticated users based on settings (e.g., the security module 220 only allows an end user to change the rate value within a predetermined range).

Wireless module 222 is a module that is configured to implement wireless communications between the microcontroller and other wireless devices. In an embodiment, the wireless module 222 may include a radio module that enables transmission and reception of wireless data transmitted via radio waves. In an embodiment, the wireless module 222 may include an antenna, a receiver, a transmitter, and/or a transceiver.

Power backup module 224 may include at least a backup battery that supplies at least enough power to maintain essential operations in the case of a loss of the primary power source, such as during a blackout.

Power lines 226a and 226b may be embodiments of the power lines 110a and 110b, which were discussed in conjunction with FIG. 1.

Switch 228 is an electrical switch that controls the connection and disconnection of the power lines 226a and 226b. In an embodiment, the switch 228 may include a solenoid that controls switching the electrical connections of one or two poles (e.g., via one or two throws). For example, the switch 228 as shown in FIG. 2A is a double pole, single throw switch that disconnects the power lines 226a and 226b when the solenoid is actuated.

Solenoid 230 includes coils that, when actuated by electrical current, form an electromagnet that changes the state of the switch 228. In an embodiment, the solenoid 230, when actuated by electrical current, opens the switch 228 and disconnects the power line 226a and 226b.

Safety devices 232 include devices that are designed to prevent damages and/or safety hazard. In at least one embodiment, safety devices 232 include smoke/$CO_2$/fire detectors. Alternatively and/or additionally, the safety devices 232 include sensors that detect fault conditions in electrical systems (e.g., sensors that detect ground faults and/or arc faults). In an embodiment, the safety devices 232 may communicate with the circuit breaker 200a, via wireless signals and/or EOP. For example, one or more of the safety devices 232 may include Wi-Fi/Powerline Sensor modules (WPSM).

Load sensors 234a and 234b, protected domain 236, and appliances 238a-n may be embodiments of the load sensors 112a and 112b, protected domain 116, and appliances 118a-n, respectively, which were discussed in conjunction with FIG. 1.

Figure 2B:
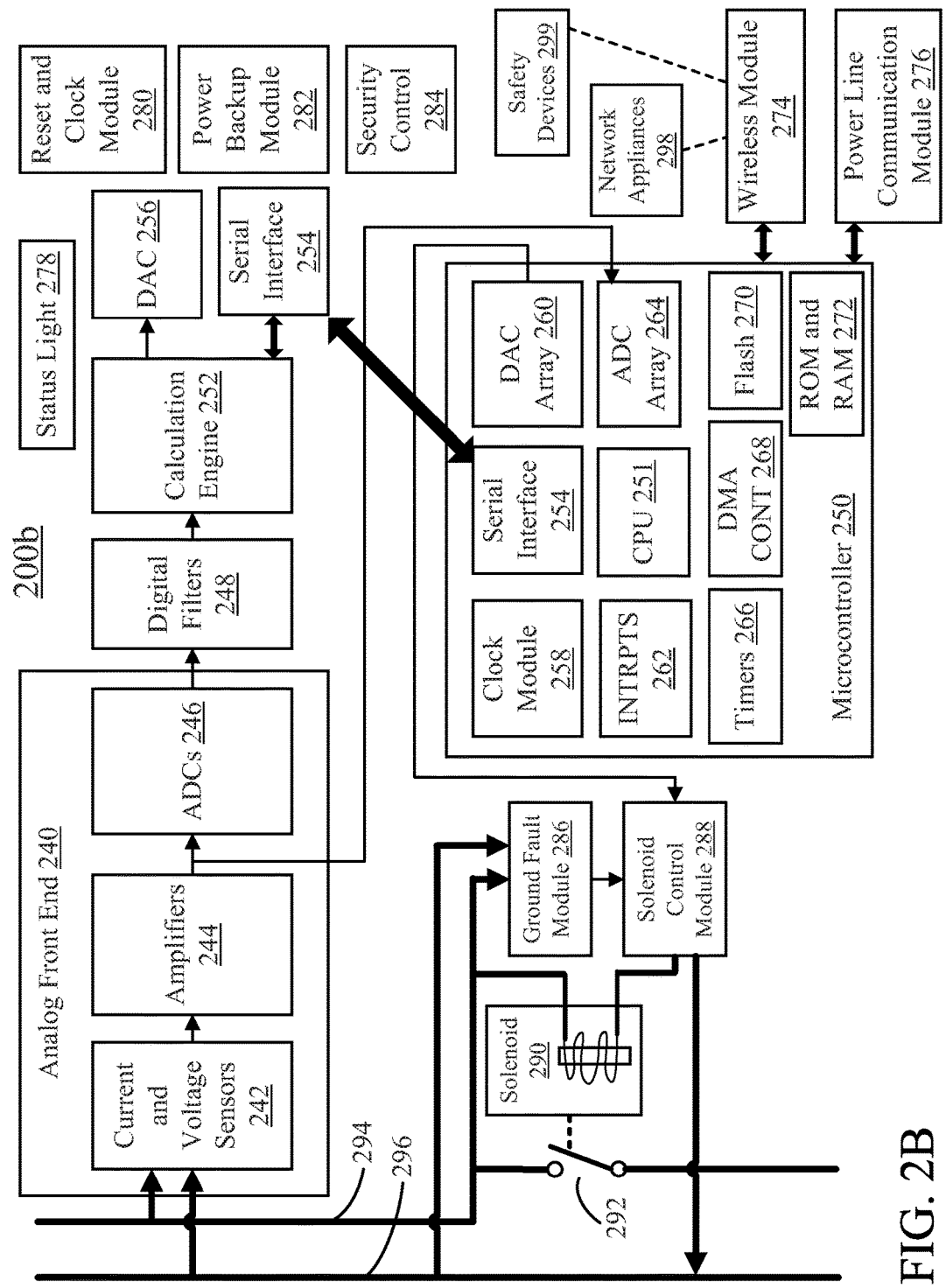
FIG. 2B shows a block diagram of an embodiment of the intelligent circuit breaker of FIG. 2A.

FIG. 2B shows a block diagram of an embodiment of the intelligent circuit breaker 200a of FIG. 2A. The intelligent circuit breaker 200b includes at least an Analog Front End (AFE) 240, current and voltage sensors 242, amplifiers 244, Analog-to-Digital Converters (ADCs) 246, digital filters 248, a microcontroller 250, a Central Processing Unit (CPU) 251, a calculation engine 252, a serial interface 254, a Digital-to-Analog Converter (DAC) 256, a clock module 258, a DAC array 260, Interrupt mechanism (INTRPTS) 262, an ADC array 264, timers 266, Direct Memory Access Controller (DMA CONT) 268, a flash memory 270, ROM and RAM 272, a wireless module 274, a powerline communication module 276, a status light 278, a reset and clock module 280, a power backup module 282, a security module 284, a ground fault module 286, a solenoid control module 288, a solenoid 290, a switch 292, and power lines 294 and 296, network appliances 298, and safety devices 299. In other embodiments, the intelligent circuit breaker 200b may not include all of the components listed and/or may include other components in addition to or instead of those listed above.

FIG. 2B shows an embodiment of components in the intelligent circuit breaker 200b that detects fault conditions and controls connection and disconnection of power supply.

Analog Front End (AFE) 240 is configured to interface a plurality of sensors (e.g., current/voltage sensors) to collect, process, and/or communicate sensed data to a digital system (e.g., a microcontroller, a processor). In an embodiment, AFE 240 includes at least sensors (e.g., current/voltage sensors), amplifiers, and/or A/D converters.

Current and voltage sensors 242 include sensors that measure current/voltage on the power lines. In an embodiment, the current and voltage sensors 242 do not disrupt the power lines.

Amplifiers 244 are electronic amplifiers that amplify the signals received from the current and voltage sensors 242 and transmit the amplified signals to analog-to-digital converters. In an embodiment, the amplifiers 244 include Programmable-Gain Amplifiers (PGA), whose gain can be controlled by external digital or analog signals.

Analog-to-Digital Converters (ADCs) 246 include one or more analog-to-digital converters that convert analog signals to digital signals. In an embodiment, the ADCs 246 convert analog values, which are received from the current and voltage sensors 242 and amplified by amplifiers 244, to digital values and provide the digital values to the microcontroller or programmable unit of the intelligent circuit breaker 200b.

Digital filters 248 are systems that filter digital signals converted by ADCs 246 and reduce or enhance certain aspects of the digital signals. In an embodiment, the digital filters 248 may include decimation filters, and/or IIR/FIR filters. In an embodiment, the digital filters 248 may include high pass filters to block direct current (DC) components.

Microcontroller 250 may be an embodiment of the microcontroller unit 202 that was discussed in conjunction with FIG. 2A. In an embodiment, the microcontroller 250 receives various measurements, such as a current, a voltage, a power factor, an apparent power, a reactive power, an instantaneous peak current/voltage, frequency components, an overload current, a ground fault information, and/or an arc current from the status/control information values of other circuit breakers, where the various measurement received are measured on-the-fly (e.g., in real time as the system is running). For example, the microcontroller 250 may receive raw data from current/voltage sensors, which may be amplified, converted, and/or filtered, and microcontroller 250 may calibrate and measure all the power related parameters internally using a Software (SW) algorithm that collects the sensor values and converts them using physical/mathematical equations to the required electrical values. In an embodiment, the microcontroller 250 also receives continuous over-the-air (wireless) signals from safety devices such as smoke/$CO_2$/fire detectors and/or other Wi-Fi/Powerline Sensor Modules (WPSM). In an embodiment, the microcontroller 250 is configured to algorithmically process instructions to connect and disconnect the current path based on the input from the safety devices. The microcontroller 250 may also be capable of comparing, and configured to compare, the measured value with rated value/range, and microcontroller 250 may issue appropriate control signals to control the switch. In an embodiment, the circuit breaker 200b may include a bimetallic ON mechanism, in which a user can switch on the power controlled by the circuit breaker using bimetallic mechanism but the user cannot switch on the power, via the circuit breaker, when there is emergency shut off (as a result of the bimetallic ON mechanism). In an embodiment, the microcontroller 250 will not allow the user to turn on when there is an emergency trip off, and the user cannot turn on power, via the breaker mechanism until the emergency has been cleared.

In an embodiment, the microcontroller 250 may communicate with other modules/units of the intelligent circuit breaker 200b for monitoring and/or controlling functions such as, but not limited to, clock, time, power backup, security control, data communications, and status indication. In an embodiment, the microcontroller 250 is programmable and can receive user settings. For example, the microcontroller 250 may receive user settings to set the rated values of current (or the rated values can be onetime settings that are hardwired for security reasons at the time of production).

In an embodiment, the microcontroller 250 is configured to algorithmically detect devices/appliances connected to the circuit breaker. In an embodiment, an advanced algorithm is trained with several components as input and detects appliances accurately. The detection of devices/appliances will be discussed further in conjunction with FIG. 11.

Central Processing Unit (CPU) 251 is a processor or microprocessor system of the microcontroller 250 that implements instruction stored in memory systems to analyze input signals and/or sensing data and control the intelligent circuit breaker 200*b*.

Calculation engine 252 is a hardware based or software based calculation engine used by the microcontroller 250 for performing calculations. In at least one embodiment, the calculation engine 252 calculates and measures active power, reactive power, and apparent power, root mean square (RMS) voltage, RMS current, power factor, power line frequency (e.g., the frequency of the current or voltage of the power line), instantaneous voltage, instantaneous current, and instantaneous power. In an embodiment, the calculation engine 252 also detects overcurrent.

Serial interface 254 is a Serial Communication Interface (SCI) that enables the serial (e.g., one bit at a time) exchange of data between a microcontroller/processor and peripheral modules/units. In an embodiment, the serial interface 254 is used for internal communication between units/modules in the circuit breaker 200*b*.

Digital-to-Analog Converter (DAC) 256 is a digital-to-analog converter that converts digital signals to analog data. In at least one embodiment, DAC 256 converts outputs of the calculation engine 252, which is in digital form, into analog signals to communicate with other modules/devices.

Clock module 258 is a module that is configured to keep track of the current year, month, day, and/or the current time.

Digital-to-analog converter (DAC) array 260 includes an array of DACs for converting digital signals to analog signals. In at least one embodiment, DAC array 260 converts digital signals to analog control instructions and send to the solenoid control module 288 to control the solenoid.

Interrupt mechanism (INTRPTS) 262 is a mechanism by which the sending/receiving of Input/Output (I/O) or an execution of instruction can suspend the normal execution of the CPU 251 of the microcontroller 250 and cause a particular issue to be addressed. In an embodiment, INTRPTS 262 is used for data transfer between other devices and the microcontroller 250 (e.g., between a master circuit breaker/microcontroller to slave circuit breaker/microcontrollers). In an embodiment, INTRPTS 262 breaks the normal sequence of execution of instructions while the CPU 251 is executing a program, and INTRPTS 262 transfers control to another program. After executing the other program, the CPU 251 returns the control back again to the main program.

Analog-to-Digital Converter (ADC) array 264 includes an array of ADCs for converting analog signals to digital signals. In at least one embodiment, the ADC array 264 receives analog data from the amplifiers 244 and converts to digital signals, which are then sent to the CPU 251 for processing and/or calculation.

Timers 266 include electronic timers that detect and recover from a software or hardware fault. In an embodiment, during normal operation, the microcontroller 250 regularly restarts the watchdog timers 266 to prevent the watchdog timers 266 from elapsing. If, due to a software or hardware fault, the microcontroller 250 fails to restart the watchdog timer 266, the watchdog timer 266 will elapse and generate a timeout signal, which is used to initiate corrective action or actions.

Direct Memory Access Controller (DMA CONT) 268 includes specialized logic that allows a hardware module or other devices to access a main system memory (e.g., RAM of the microcontroller 250) independently of the CPU 251.

Flash memory 270 is an electronic non-volatile storage medium internal to the microcontroller 250 that can be electrically erased and reprogrammed.

Read Only Memory (ROM) and Random Access Memory (RAM) 272 are internal ROM and RAM of microcontroller 250.

Wireless module 274 may be an embodiment of the wireless module 222 that was discussed in conjunction with FIG. 2A. In an embodiment, the wireless module 274 may include an antenna and receiver/transmitter that are installed and/or embedded on an outer case of the circuit breaker 200*b* (e.g., front or back or sides depends on circuit breaker location). In an embodiment, the wireless module 274 allows transmission and reception of data wirelessly.

Powerline communication module 276 may be an embodiment of the powerline communication module 218 that was discussed in conjunction with FIG. 2A. In an embodiment, the powerline communication module 276 uses existing powerline communication protocols to communicate with sensors and/or other appliances over the power lines.

Status light 278 includes at least one light that serves as an indicator indicating the working status of the circuit breaker 200*b* and/or status of failure/emergency. In an embodiment, the status light 278 includes one or more light emitting diodes (LEDs). In an embodiment, a user can monitor emergency/failure code status through the status light 278. In one embodiment of a single LED being used to communicate the status, duration of on and off of the single LED will communicate status of different failure codes. In another embodiment of a multi-color LED being used, different failure code status may be communicated via different colors, on/off duration, and/or color blink duration. In another embodiment, different LEDs may be used to indicate different status and/or failure codes.

Reset and clock module 280 includes circuitry that includes a clock and facilitates the resetting of various parameters. The reset brings the system to a known good state that enables initialization, software upgrades, debugging, and recovery from operational malfunctions of the system itself. The clock provides the basic periodic synchronizing event for system. The reset and clock, though independent of each other are grouped together, because both facilitate getting the system to the correct initial state.

Power backup module 282 may be an embodiment of the battery backup module 224 that was discussed in conjunction with FIG. 2A. In an embodiment, the power backup module 282 provides power to all the digital/analog units in the circuit breaker 200*b*, allowing the circuit breaker 200*b* to maintain essential operations in the case of a loss of primary power.

Security module 284 may be an embodiment of the security module 220 that was discussed in conjunction with FIG. 2A. In an embodiment, the security module 284 controls access to the programmable functions of the microcontroller 250 to prevent unauthorized access.

Ground fault module 286 is a module that is configured to detect unintentional current paths between a power line and the ground. In an embodiment, the ground fault module 286 outputs a signal to a solenoid control module if a ground fault is detected.

Solenoid control module 288 includes circuitry that receives input from the microcontroller 250, ground fault module 286, mechanical control, and/or arc fault detection circuitry. In an embodiment, based on the signals received, the solenoid control module 288 controls the current flow to the solenoid 290, which in-turn controls turning the switch for one or more power lines off. For example, the solenoid control module 288 may receive a signal from the ground fault module 286 which detects a ground fault, and then actuates the solenoid to disconnect the power lines. In another example, the solenoid control module 288 may receive a signal from the microcontroller 250 when an overcurrent is detected or when a safety device detects safety hazard, and in response disconnects the power lines. In another example, a user may manually turn off a mechanical control connected to the solenoid control module and thus cause the circuit to disconnect.

Solenoid 290, switch 292, and power lines 294 and 296 may be embodiments of the solenoid 230, switch 228, and power lines 226a and 226b, respectively, which were discussed in conjunction with FIG. 2A. In an embodiment, the power line 296 is a neutral line (or ground line). In an embodiment, the switch 292 is controlled by the solenoid 290 to connect and disconnect the power lines 294a and 294b. In an embodiment, the power lines 294a and 294b provide electric power to the modules/units of the circuit breaker 200b.

Network appliances 298 include intelligent wireless capable appliances/devices (e.g., PCs, laptop computers, smart phones, tablet computers) that can be connected to a wireless network. In an embodiment, the network appliances 298 communicate wirelessly with the wireless module 274 to control and/or monitor the circuit breaker 200b. The addition of a remotely controllable (e.g., via a wireless network) capability in the circuit breaker 200b allows the status and data of the circuit breaker 200b to be monitored as well as controlled remotely. For example, a downloadable application and/or web page may be made available to the user for checking the status of circuit breakers, so that the user may check the status of the circuit breaker 200b, via the application, that has been downloaded to, and is running on, a smart phone (or other network appliance), and/or the status of the breakers may be checked on a webpage of a server, which may be viewed using a smart phone (or other network appliance), providing the user with better safety, status information, diagnostics and control over appliances and loads on his/her electrical network.

Safety devices 299 are embodiments of the safety devices 232, which were discussed in conjunction with FIG. 2A. In an embodiment, the safety devices 299 send signals via wireless communication to the wireless module 274 or via EOP to the power line communication module 276.

Figure 3:
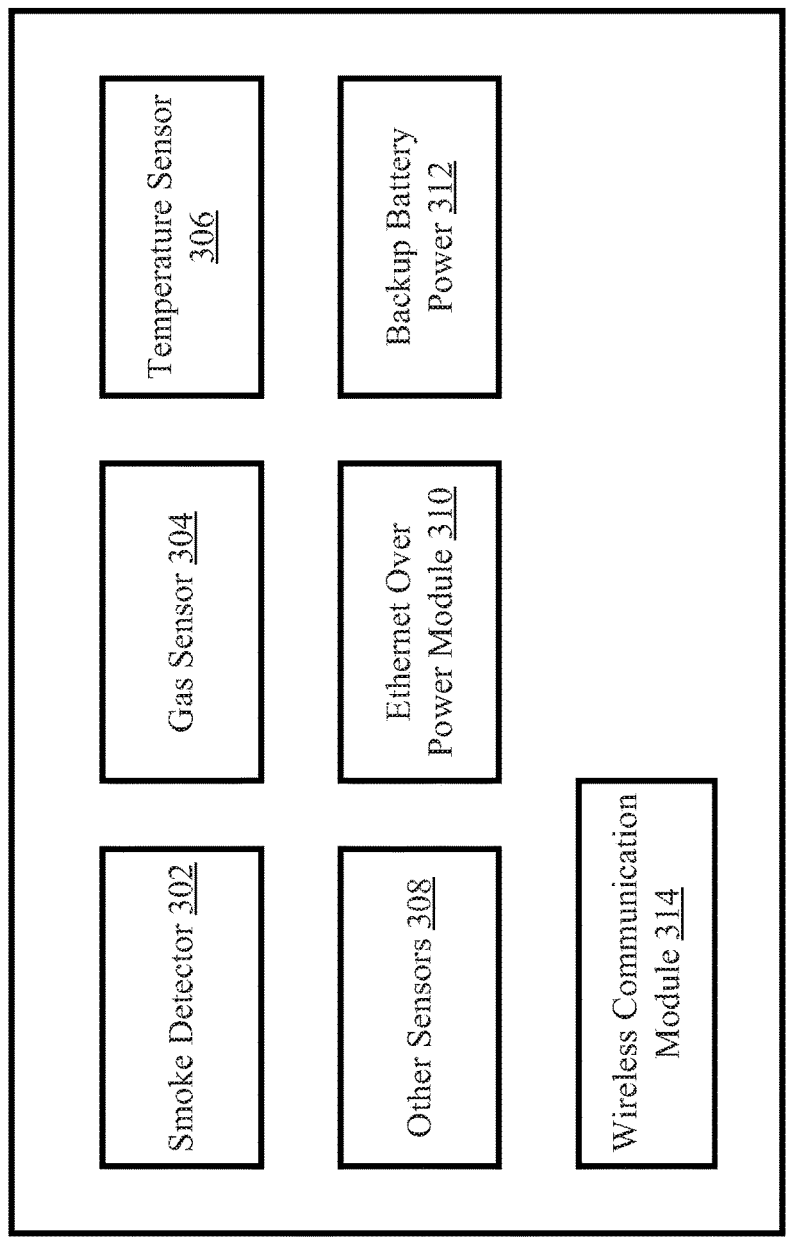
FIG. 3 shows a block diagram of an embodiment of a multi-sensor device that has both wireless communications and Ethernet over powerline communications.

FIG. 3 shows a block diagram of an embodiment of a multiple sensor device 300 that has both wireless and Ethernet Over Powerline (EOP) communications. The multi-sensor device 300 includes at least a smoke detector 302, a gas sensor 304, a temperature sensor 306, other sensors 308, an Ethernet Over Powerline (EOP) module 310, a backup battery power 312, and a wireless communication module 314. In other embodiments, the multiple sensor device 300 may not include all of the components listed and/or may include other components in addition to or instead of those listed above.

FIG. 3 shows an embodiment of a multiple sensor device 300 that includes modules used as elements to sense and transmit status and measurements to the microcontroller unit 202 of FIG. 2A or the microcontroller 250 of FIG. 2B.

Smoke detector 302 is a device that automatically detects and gives a warning of the presence of smoke. In an embodiment, the smoke detector 302 sends a signal as an indicator of fire, via wireless or EOP communication, to the circuit breaker, and in response the circuit breaker may disconnect the power lines and/or report the fire indication to the user and/or fire department.

Gas sensor 304 is a device that detects the presence of gases in an area, indicating a gas leak. In an embodiment, the gas sensor 304 detects a gas leak and interfaces with the microcontroller of the circuit breaker, so that the circuit breaker shuts down the gas flow and/or reports the gas leak to the user.

Temperature sensor 306 is a device that measures the temperature and provides the temperature data as an electrical signal to the microcontroller of the circuit breaker. In an embodiment, temperature sensor 306 reports the temperature of a room, water, or heating elements to the microcontroller.

Other sensors 308 may include other types of sensors that may detect light, sound, pressure, motion, for example, and transfer sensed data to the microcontroller of the circuit breaker.

Ethernet Over Power (EOP) module 310 is a module installed in the multi-sensor device 300 that facilitates use of existing power lines as a media to communicate with the circuit breaker. In at least one embodiment, the EOP module 310 may facilitate use of existing powerline communication protocols to transmit data from the sensors to the microcontroller of the circuit breaker, serving as a backup communication channel in case wireless network fails.

Backup battery power 312 may include at least a backup battery that supplies at least enough power to maintain essential operations of the multi-sensor device 300 in the case of a loss of the primary power source, such as during a blackout.

Wireless communication module 314 is a module that is configured to implement wireless communications between the multi-sensor device 300 and the microcontroller of the circuit breaker. In an embodiment, the wireless communication module 314 may include a radio module that enables transmission and reception of wireless data transmitted via radio waves. In an embodiment, the wireless communication module 314 may include an antenna, a receiver, a transmitter, and/or a transceiver.

Figure 4:
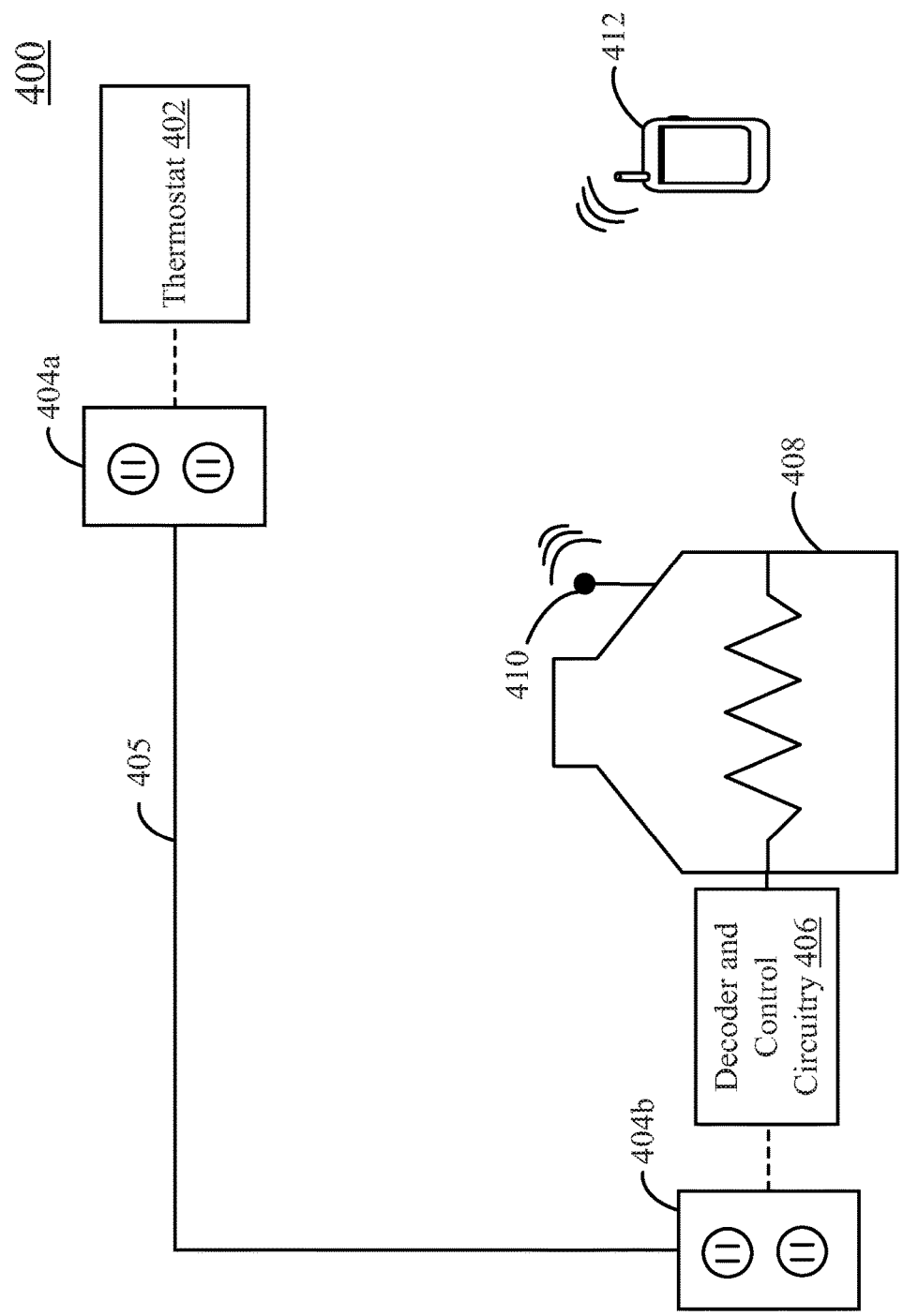
FIG. 4 shows a diagram of an embodiment of a smart Climate control unit.

FIG. 4 shows a diagram of an embodiment of a smart Climate control unit 400. The smart Climate control unit 400 includes at least a thermostat with controls 402, power outlets 404a and 404b, a power line 405, a decoder and control circuitry 406, a furnace/air conditioner 408, a receiver/transmitter 410. FIG. 4 also shows a user device 412 that communicates with the furnace. In other embodiments, the smart Climate control unit 400 may not include all of the components listed and/or may include other components in addition to or instead of those listed above.

FIG. 4 shows an embodiment of a smart Climate control unit 400 that may be controlled remotely. In an embodiment, the smart Climate control unit 400 is a wireless enabled and/or EOP enabled device that can adjust its heating or cooling output based on receiving temperature feedback from wireless sensors, EOP sensors, and/or a mobile device. In an embodiment, a conventional Air Conditional (AC) and/or furnace is controlled by a thermostat that has dedicated wires connected between the thermostat and the AC and/or furnace. In an embodiment, the smart Climate control unit 400 includes a wireless port or Wi-Fi/Powerline adapter so that the smart Climate control unit 400 can be controlled from any of several thermostats, which may be in different rooms or in different buildings. Alternatively or additionally, the smart Climate control unit 400 may be controllable by a mobile thermostat (or an application running on a mobile device and/or on a website). In an embodiment, the smart Climate control unit 400 does not require a dedicated wired connection between the AC and/or furnace and thermostat. The smart Climate control unit 400 can be controlled directly and/or through router by PCs, mobile phones, or tablet computers, for example.

Thermostat 402 is a device that automatically regulates temperature, by activating the AC and/or furnace when the temperature reaches a certain point. In an embodiment, a conventional thermostat is connected via a dedicated wire to the furnace so as to control the AC and/or furnace. In an embodiment, the thermostat 402 has Ethernet Over Powerline (EOP) module and can send signals over existing power lines to communicate with the furnace and/or AC, thereby using the power lines as communication cables to control the AC and/or furnace. In an embodiment, the EOP based thermostat 402 can be attached and/or moved to any power outlet in the home (so as to connect to the power line for EOP communication), so that based on the temperature near the power outlet, the furnace/AC can be controlled. For example, the user just plugs the EOP based thermostat 402 into the outlet in the wall, and then using an interface on the EOP and/or using an interface on a mobile device or network appliance that is in communication with the EOP, the user may adjust the temperature settings for the room in which the thermostat 402 is placed. In at least one embodiment, the EOP module can have optional wireless (e.g., Wi-Fi) interface which can be controlled by other wireless devices, such as a personal computer (PC), laptop computer, mobile phone, tablet computer, or other network appliance. In another embodiment, the thermostat 402 may include the wireless (e.g., Wi-Fi) interface, without the EOP module, and send wireless signals to a gas flow controller or power controller that also has wireless modules to control the AC and/or furnace. In an embodiment, the EOP thermostat 402 can control either a furnace or air conditioner. In another embodiment, the EOP thermostat 402 can control both the AC and/or furnace in the same residence/commercial/industrial/factory complex.

Power outlets 404a and 404b include sockets into which the thermostat 402 and/or other devices may be plugged and receive power as well as EOP communication.

Power line 405 is a power line through which electrical power may be provided and EOP communication may be carried out.

Decoder and control circuitry 406 is a circuit that is configured to decode the control signals received, via the EOP, from the thermostat 402 to control the AC and/or furnace.

Climate control module 408 refers to a system that includes a furnace and/or an air conditioner. The furnace may be powered by gas, electricity, or oil in which air or water may be heated to be circulated throughout a building. The air conditioner may be powered by electrical power and may be used to lower the air temperature.

Receiver/transmitter 410 serves to receive and/or transmit wireless signals. In an embodiment, the receiver/transmitter 410 includes an antenna. In an embodiment, the smart Climate control unit 400 includes a wireless communication unit (e.g., a Wi-Fi unit) that has the receiver/transmitter 410, so that the smart Climate control unit 400 can be controlled via wireless signals from multiple wireless devices. Throughout this specification, the terms "communication unit," "communication module," "Wi-Fi unit," and "Wi-Fi module" are used interchangeably, and may be substituted one for another to obtain different embodiments.

User device 412 may include various electronic devices that are used by the users to communicate with the circuit breaker system and/or other wireless enabled devices. In at least one embodiment, the user devices 412 may include, but are not limited to, smart phones, PDA (Personal Digital Assistant), tablets, laptops, remote controllers, and personal computers. In at least one embodiment, the user device 412 includes at least signal transmitters and/or receivers for sending and/or receiving wireless signals. In an embodiment, the user device 412 may be used to control and/or monitor the smart Climate control unit 400. In at least one embodiment, the user device 412 may include a smart phone that has a thermistor (which includes a thermally sensitive resistor), thermocouple (which is a thermoelectric sensor), and/or other electronic temperature sensors to measure the temperature. An application may run on the smart phone that provides a thermostat interface and displays the readings from the temperature sensor(s) and/or the available settings on the smart Climate control unit 400. For example, the thermostat interface may include a reading for the current temperature and one or more temperature control tools, such as a field, dial, or slider for entering the desired temperature to set the smart Climate control unit 400 to. The thermostat interface may also include an electronic page for setting and displaying the time periods and settings and displaying a desired particular temperature at which to set the smart climate control unit 400. The smart phone having the thermostat interface may produce a signal that is sent to the Climate control module 408 to adjust the temperature, based on the user's selected settings. In the abovementioned embodiment, the mobile phone serves as a mobile thermostat that provides a thermostat app (with the thermostat interface), which may be based on the temperature sensor(s) (e.g. a thermistor) on the smart phone and user settings. In an embodiment, regardless of which room the user is in, wherever the user is in the house, the user can automatically control the climate control module 408 based on the temperature around the smart phone, removing the need of a dedicated thermostat installed in each room or in a dedicated location.

Figure 5:
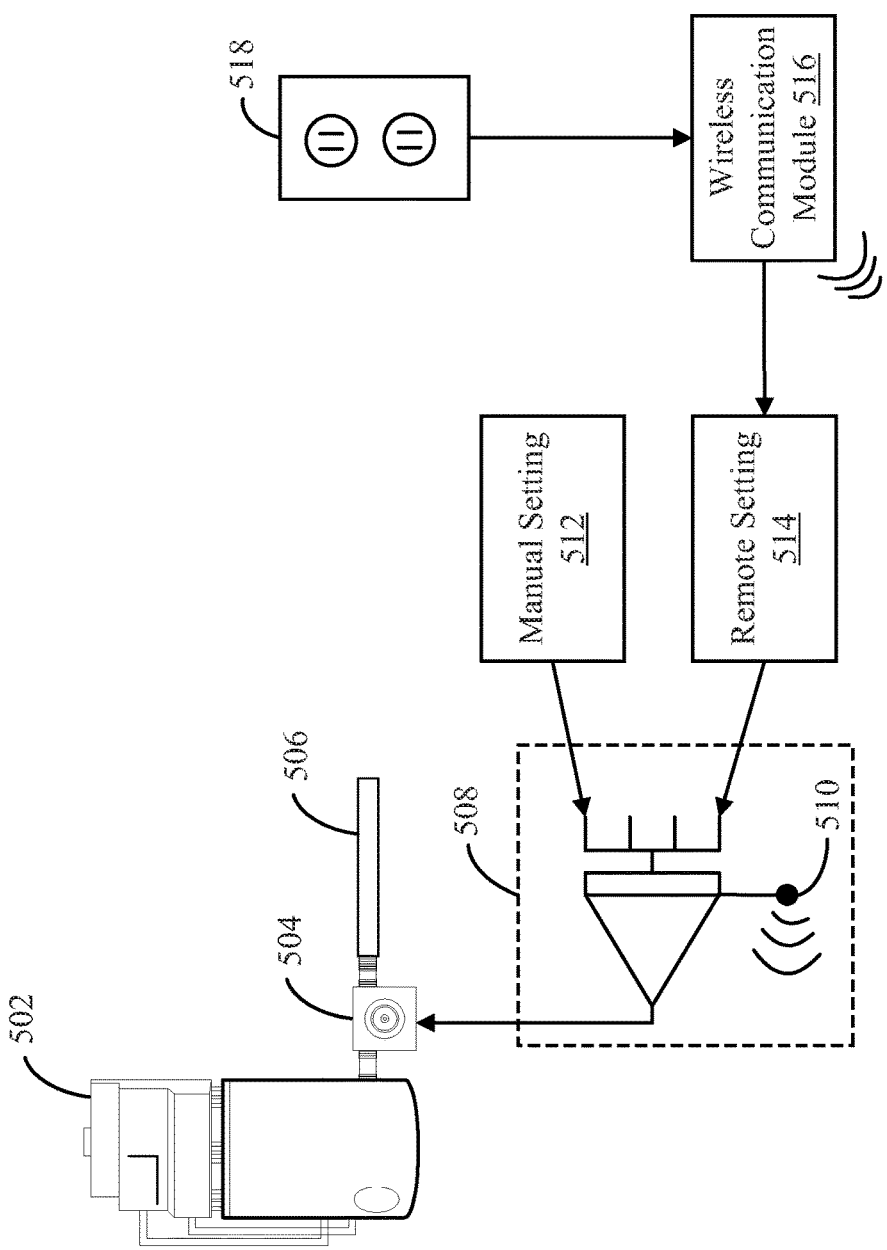
FIG. 5 shows a diagram of an embodiment of a smart water heater unit.

FIG. 5 shows a diagram of an embodiment of a smart water heater unit 500. The smart water heater unit 500 includes at least a water heater 502, a gas flow controller 504, a gas inlet 506, a solenoid valve 508, a receiver/transmitter 510, a manual setting 512, a remote setting 514, a wireless communication module 516, and a power outlet 518. In other embodiments, the smart water heater unit 500 may not include all of the components listed and/or may include other components in addition to or instead of those listed above.

FIG. 5 shows an embodiment of a smart water heater unit 500 that includes a solenoid valve that allows a user device to control the temperature settings of the water heater remotely.

Water heater 502 is an appliance that heats water and provide a continual supply of hot water. In an embodiment, the water heater 502 is powered by gas or electrical power. In an embodiment, conventional water heaters are controlled by thermostats that are physically located on the water heaters and are manually controlled. In at least one embodiment, the water heater 502 includes wireless (e.g., Wi-Fi) and/or powerline adapter port integrated into or attached to the water heater 502, so that the water heater 502 can be controlled (e.g., by being turned on/off and/or set the desired temperature) by a user device remotely. Having wireless control enables the user to bypass the existing manual control (e.g., a rotary temperature control switch). In an embodiment, when the wireless module is not communicating with the user device or circuit breaker or if the wireless module is down, then the wireless control module cannot override the manual control settings, and the manual settings are automatically applied to control the temperature. In an embodiment, when the wireless module at the water heater 502 is not communicating with the router or the user device, then user will be informed through email/Notification or through other messaging methods.

Gas flow controller 504 is a control module that is configured to control the gas flow into the heating mechanism of the water heater 502. In an embodiment, the gas flow controller 504 may include a solenoid valve that is an electromechanically operated valve, which when actuated, controls the gas flow to the water heater 502 and thereby turns on/off the water heater 502. In an embodiment, the gas flow controller 504 receives signals from a thermostat via which the temperature is set by the user and/or system. Alternatively or additionally, the solenoid valve of the gas flow controller 504 is controlled by a thermostat that is manually controlled.

Gas inlet 506 is a channel that allows gas to enter the water heater 502 without escaping into the atmosphere. In an embodiment, the gas flow controller 504 controls the flow of gas, via the gas inlet 506, into the water heater 502.

Thermostat 508 is a thermostat that receives temperature settings and sends signals to the gas flow controller 504 to control on/off the water heater 502 to adjust the temperature of water. In an embodiment, the thermostat 508 receives signals from temperature sensors indicating the current water temperature in the water heater 502. In an embodiment, the thermostat 508 can be wirelessly actuated and thus may be controlled by other wireless (e.g., Wi-Fi) devices in the home. Alternatively or additionally, the thermostat 508 can be actuated via EOP using existing power line in the home. In an embodiment, only devices at the home having the thermostat 508 can control the thermostat 508. In an embodiment, security and authentication may be enabled via the mechanisms available in existing wireless and wire protocols. For example, the wirelessly actuated thermostat 508 could be wired to the gas flow controller 504 for turning on the water heater 502 that uses gas, a gas cooking range, a gas furnace, and/or the main gas line to a house.

Receiver/transmitter 510 serves to receive and/or transmit wireless signals. In an embodiment, the receiver/transmitter 510 includes an antenna. In an embodiment, the thermostat 508 includes a wireless communication unit (e.g., a Wi-Fi unit) that has the receiver/transmitter 510, so that the thermostat 508 can be controlled via wireless signals from multiple wireless devices.

Manual setting 512 allows the user to set the temperature manually. In an embodiment, the manual setting 512 provides a rotary switch, a tab, and/or buttons on the thermostat 508 for the user to input desired temperature, schedule, and/or other user settings.

Remote setting 514 allows the user device or the circuit breaker to set the settings remotely. In an embodiment, the user device may send wireless signals directly to the thermostat 508, or the user device may send wireless signals to the intelligent circuit breaker, and the circuit breaker controls the thermostat 508 via wireless communication and/or EOP.

Wireless communication module 516 may be an embodiment of the wireless module 222 or wireless communication module 276, which were discussed in conjunction with FIGS. 2A and 2B, respectively. In an embodiment, the wireless communication module 516 is configured to implement wireless communications between the intelligent circuit breaker and other wireless devices (e.g., the thermostat 508, the user device). In an embodiment, the wireless communication module 516 may also include EOP adaptor for using EOP communication.

Power outlet 518 may be an embodiment of the power outlets 404a and 404b, which were discussed in conjunction with FIG. 4.

Figure 6:
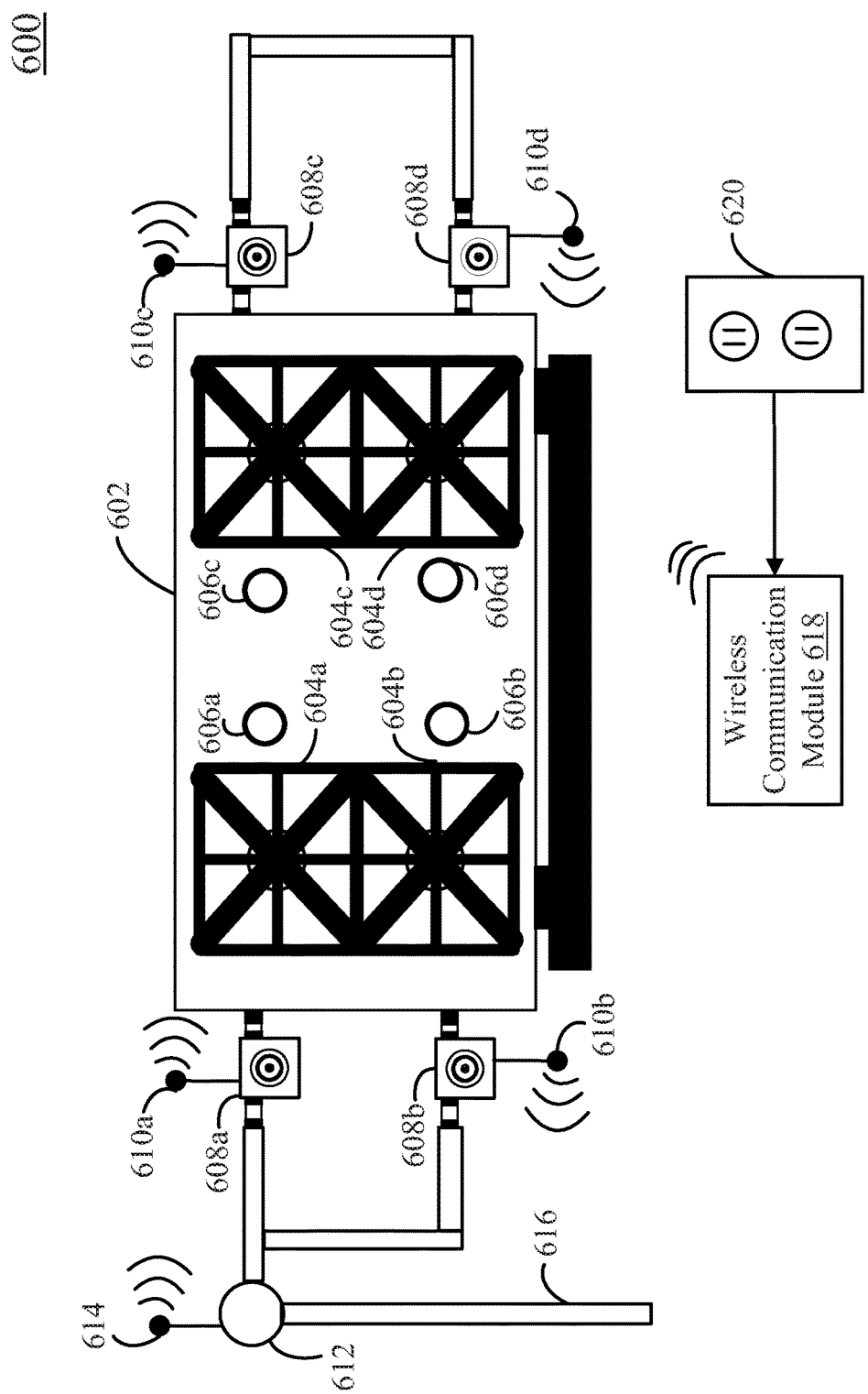
FIG. 6 shows a diagram of an embodiment of a smart gas cooking range unit.

FIG. 6 shows a diagram of an embodiment of a smart gas cooking range unit 600. The smart gas cooking range unit 600 includes at least a gas cooking range 602, burners 604a-d, manual controllers 606a-d, gas flow controllers 608a-d, receivers/transmitters 610a-d, a gas valve 612, a receiver/transmitter 614, gas inlet 616, a wireless communication module 618, and a power outlet 620. In other embodiments, the smart gas cooking range unit 600 may not include all of the components listed and/or may include other components in addition to or instead of those listed above.

FIG. 6 shows an embodiment of a smart gas cooking range unit 600 that includes gas flow controllers that may be actuated by wireless control or Ethernet over powerline (EOP) using a user device (e.g., the user's mobile phone or computer). The wireless or EOP control allows fine grain control of the temperature of each burner of the cooking range over a period of time including turning off any or all burners in emergencies.

Gas cooking range 602 is a cooker/stove that uses natural gas or other flammable gas as a fuel source. In an embodiment, the gas cooking range 602 has a number of burners that are individually controlled for cooking.

Burners 604a-d burns flammable gas into a flame for cooking. In an embodiment, the burners 604a-d have individual gas inlet channels and are individually controlled.

Manual controllers 606a-d are manually controlled to modulate flame size of the burners 604a-d. In an embodiment, each of the burners 604a-d is individually controlled by one of the manual controllers 606a-d. In an embodiment, the manual controllers 606a-d include knobs to adjust the flame size.

Gas flow controllers 608a-d may be embodiments of the gas flow controller 504, which was discussed in conjunction with FIG. 5. In an embodiment, the gas flow controller 688a-d may receive wireless signals (e.g., Wi-Fi signals) and thereby can be monitored and/or controlled wirelessly. In an embodiment, an application may be run on a network device that provides an interface for the user to interact with, to set the cooking times on the cooking range and/or monitor the working status of the burners 604a-d. In an embodiment, each of the burners 604a-d is equipped with an individual gas flow controller. In at least one embodiment, the interface may be provided via which the user can turn on/off one or more of the burners 604a-d and/or set the burner(s) to a desired flow rate/temperature/cooking time.

Receivers/transmitters 610a-d may be embodiments of the receiver/transmitter 410 or receiver/transmitter 510, which were discussed in conjunction with FIGS. 4 and 5. In an embodiment, the receivers/transmitters 610a-d serve to receive and transmit wireless signals, so as to communicate with the intelligent circuit breaker.

Gas valve 612 is a main gas valve that controls the gas glow to all the burners 604a-d. In an embodiment, the gas valve 612 is a solenoid controlled valve that includes a wireless module, which allows the intelligent circuit breaker to control the gas valve 612 to turn on or shut off the gas flow to the entire gas cooking range 602.

Receiver/transmitter 614 may be an embodiment of the receiver/transmitter 410 or receiver/transmitter 510, which were discussed in conjunction with FIGS. 4 and 5. In an embodiment, the receiver/transmitter 614 allows the gas valve 612 to be controlled remotely by the intelligent circuit breaker.

Gas inlet 616 may be an embodiment of the gas inlet 506, which was discussed in conjunction with FIG. 5. In an embodiment, the gas inlet 616 is controlled by a main gas valve 612 and then with individual gas flow controllers 608*a-d* to control the flame of each burner.

Wireless communication module 618 may be an embodiment of the wireless module 222, wireless communication module 276, or wireless communication module 516, which were discussed in conjunction with FIGS. 2A, 2B, and 5, respectively. Power outlet 620 may be an embodiment of the power outlets 404*a* and 404*b*, or power outlet 518, which were discussed in conjunction with FIGS. 4 and 5, respectively. In an embodiment, the gas cooking range unit 600 may be controlled by the intelligent circuit breaker via wireless and/or EOP communications.

Figure 7:
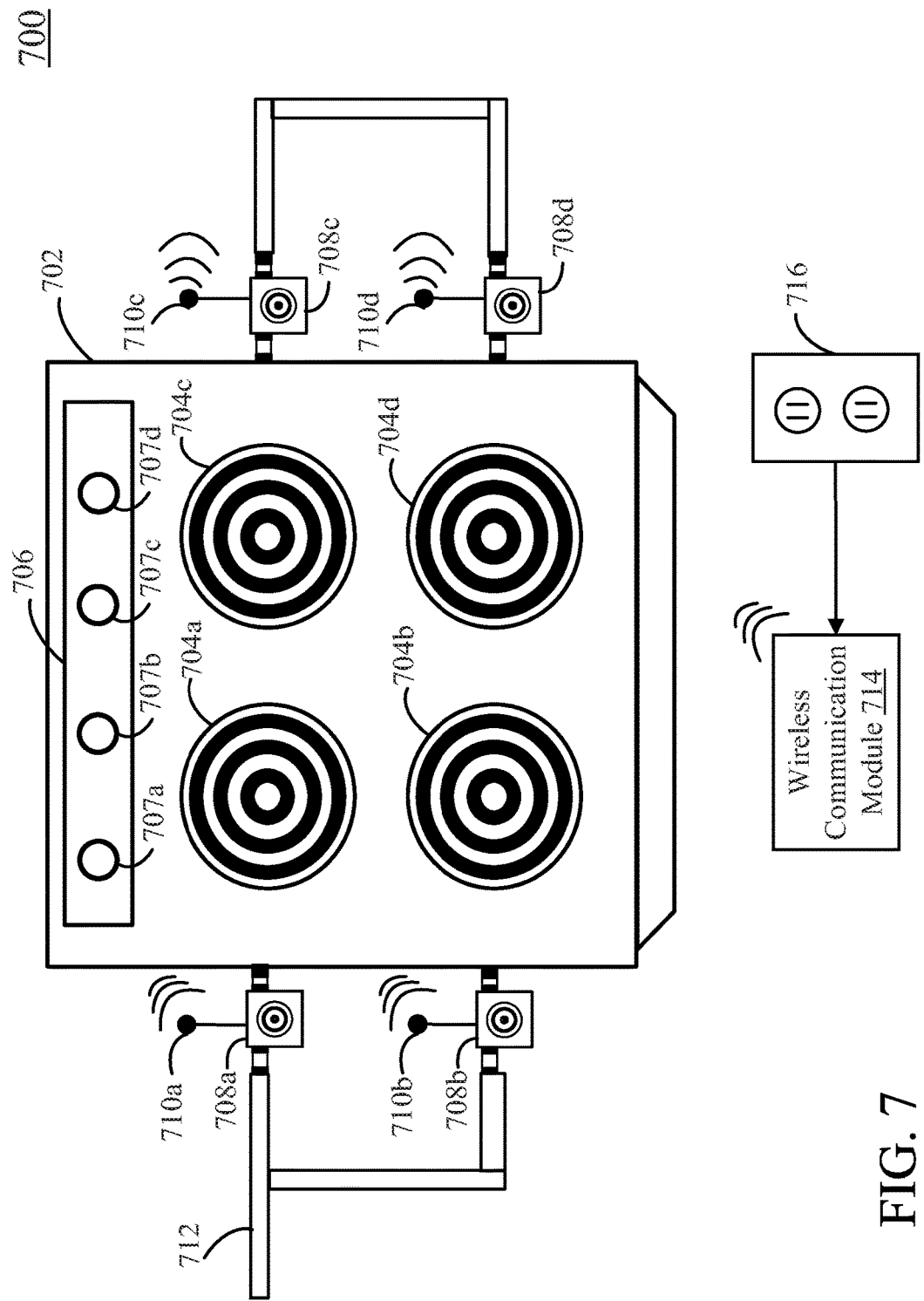
FIG. 7 shows a diagram of an embodiment of a smart electric cooking range unit.

FIG. 7 shows a diagram of an embodiment of a smart electric cooking range unit 700. The smart electric cooking range unit 700 includes at least an electric cooking range 702, heating elements 704*a-d*, a control panel 706, manual controllers 707*a-d*, power controllers 708*a-d*, receivers/transmitters 710*a-d*, an electric line 712, a wireless communication module 714, and a power outlet 716. In other embodiments, the smart electric cooking range unit 700 may not include all of the components listed and/or may include other components in addition to or instead of those listed above.

FIG. 7 shows an embodiment of a smart electric cooking range unit 700 that uses RMS power controller actuated by wireless control or EOP. Similar to the smart gas cooking range unit 600 of FIG. 6, the wireless or EOP control allows fine grain control of the temperature of each heating element of the smart electric cooking range unit 700 over a period of time (e.g., adjusting cooking time/schedule, turning off any particular heating element and/or the entire cooking range in emergencies).

Electric cooking range 702 is a cooker/stove that converts electrical energy into heat to cook and bake. In an embodiment, the electric cooking range 702 has a number of heating elements that are individually controlled for cooking.

Heating elements 704*a-d* are electric heating elements that include different combinations of electrical resistances to generate heat when electric current passes. In an embodiment, the heating elements 704*a-d* may each has a thermostat for controlling the temperature of each heating element.

Control panel 706 is a panel that includes manual controllers for controlling the heating power of each heating element.

Manual controllers 707*a-d* may include rotary switches, knobs, and/or buttons that allow the user to manually control electrical resistances of each heating element through which electric current passes to generate heat.

Power controllers 708*a-d* are control modules that are configured to control electric current to each heating element. In an embodiment, the power controller 688*a-d* may receive wireless signals (e.g., Wi-Fi signals) and thereby can be monitored and/or controlled wirelessly. In an embodiment, user may interact with an embodiment of the interface, as described in conjunction with FIG. 6, to set the cooking times of the power controller 708*a-d* and/or monitor the temperature of the heating elements 704*a-d*. In an embodiment, each of the heating elements 704*a-d* is equipped with an individual power controller. In at least one embodiment, the user may interface with the interface to turn on/off one or more of the heating elements 704*a-d* by turning on/off the corresponding power controller(s) to control the temperature and/or set the heating element to a desired temperature/cooking time.

Receivers/transmitters 710*a-d* may be embodiments of the receiver/transmitter 410, receiver/transmitter 510, receivers/transmitters 610*a-d*, or receiver/transmitter 614, which were discussed in conjunction with FIGS. 4, 5, and 6. In an embodiment, the receivers/transmitters 710*a-d* allows the electrical power supply to the electric cooking range 702 to be controlled remotely by the intelligent circuit breaker.

Electric line 712 provides electric power to the electric cooking range 702.

Wireless communication module 714 may be an embodiment of the wireless module 222, wireless communication module 276, wireless communication module 516, or wireless communication module 618, which were discussed in conjunction with FIGS. 2A, 2B, 5, and 6, respectively. Power outlet 716 may be an embodiment of the power outlets 404*a* and 404*b*, power outlet 518, or power outlet 620, which were discussed in conjunction with FIGS. 4, 5, and 6, respectively. In an embodiment, the electric cooking range unit 700 may be controlled by the intelligent circuit breaker, via wireless and/or EOP communications.

In at least one embodiment, other cooking appliance, such as an oven and electric cooker, may be controlled and monitored in a similar manner as the gas cooking range 602 and electric cooking range 702. In at least one embodiment, tools are provided to the user in the interface, via which the user may turn on/off the electric cooking appliance, set the cooking appliance to turn off automatically after a user chosen a period of time (e.g., cooking time), and/or set a temperature desired by the user. In an embodiment, the user may set the cooking appliance to stay at one flow rate of gas and/or temperature for a given period of time and then turn off or switch to a different flow rate/temperature. For example, a cooking appliance (e.g., the gas cooking range 602, the electric cooking range 702, an oven, an electric cooker) may be set by the user from a cell phone (which runs an interface for the cooking appliance) to one flow rate/temperature for cooking the food, and then according to a user chosen setting, after a given period at which the user expects food to be cooked, the cooking appliance is automatically set to a lower flow rate/temperature to keep the food warm until the user is ready to eat the food. As another example, the cooking appliance may be set by the user from a cell phone to one flow rate/temperature for cooking the food, and then according to a user chosen setting, after a given period at which the user expects food to be close to being ready, the cooking appliance is automatically set to a higher flow rate/temperature for a short amount of time to singe the food, make the food crispy, and/or otherwise positively affect the texture of the food.

In an embodiment, using the wirelessly-actuated cooking range for a household cooking range minimizes/reduces the need for a human presence at all times when the food is being cooked. The wirelessly-actuated cooking range may be convenient for cooking foods that need variable settings (different food temperatures during different phases of cooking). In an embodiment, extra safety detectors and alarms may be provided for remote cooking, such an extra sensitive smoke and/or aroma detector, a camera, and a microphone for picking up issues that may indicate that it is desirable to shutoff the stove prematurely. In an embodiment, the temperature and duration of each phase of the cooking can be set in sequence and notification and alerts can be sent, via a mobile device, to the person monitoring the cooking, so to only require the user to return to the cooking range when an intervention is needed.

Figure 8A:
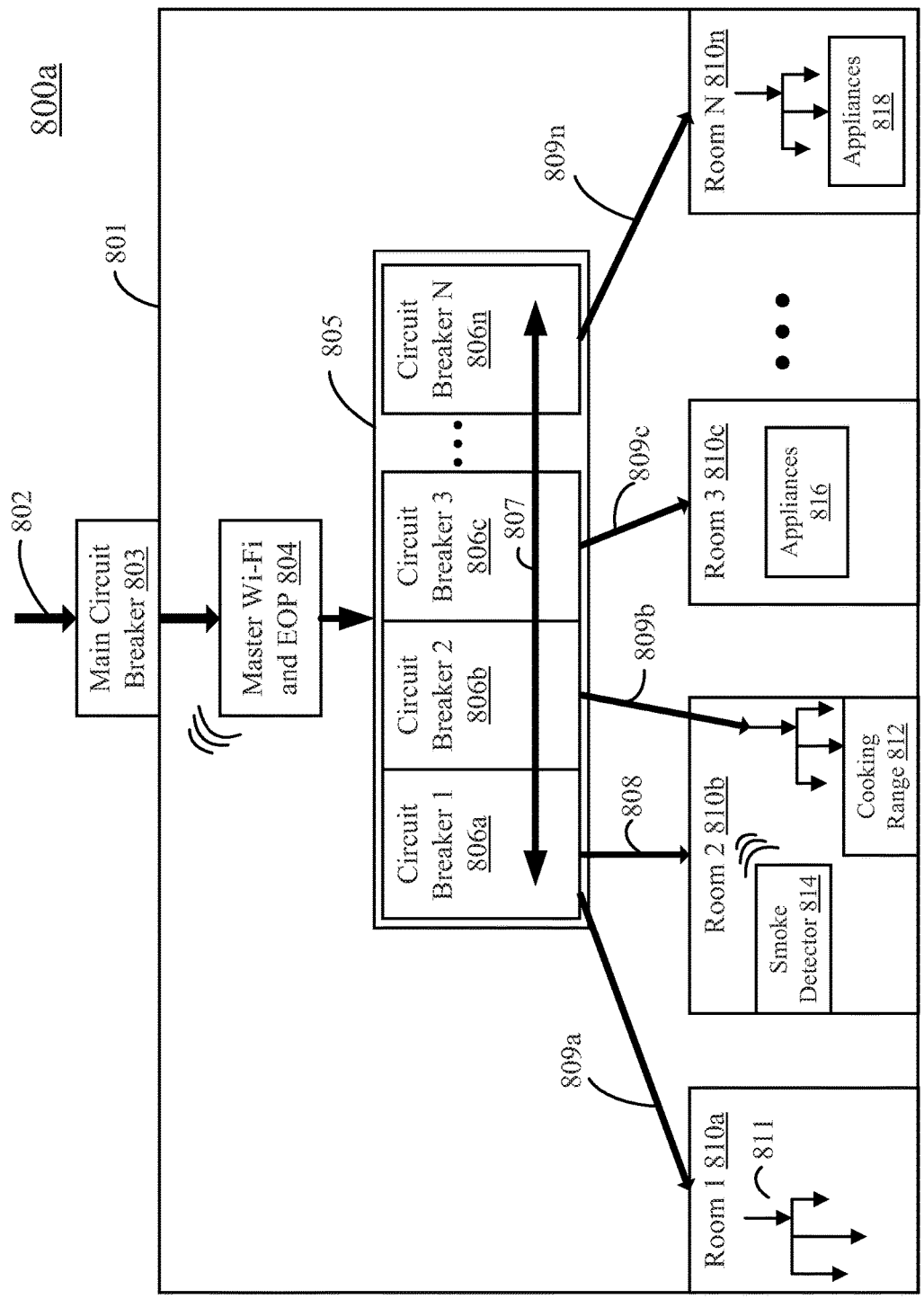
FIG. 8A shows a diagram of an embodiment of a circuit breaker panel that includes an array of circuit breakers that control electrical power to different rooms/appliances.

FIG. 8A shows a diagram of an embodiment of a circuit breaker panel 800*a* that includes an array of circuit breakers that control electrical power to different rooms/appliances. The circuit breaker panel 800a includes at least a complex 801, a power line 802, a main circuit breaker 803, master Wi-Fi and EOP 804, a circuit breaker panel 805, circuit breakers 1-n 806a-n, a communication bus 807, power lines 808 and 809a-n, rooms 1-n 810a-n, power lines 811, a cooking range 812, a smoke detector 814, appliances 816 and 818. In other embodiments, the circuit breaker panel 800a may not include all of the components listed and/or may include other components in addition to or instead of those listed above.

FIG. 8A shows that multiple circuit breakers having the functionality as mentioned in conjunction with FIGS. 1-7, which can be assembled together into a circuit breaker panel. In an embodiment, one circuit breaker takes on the role of a master/main circuit breaker that controls multiple slave circuit breakers that each controls a specific appliance or group of loads/appliances in a residential/office/commercial/industrial complex. A conventional circuit breaker system may include an array of independent units that have no mechanism of communicating to each other. In an embodiment, the circuit breaker panel 800a includes a communication mechanism (e.g., wired and/or wireless) within the array of circuit breakers and can coordinate the electrical systems controlled by all the circuit breakers. The circuit breaker panel 800a can coordinate shut-off of electrical systems in emergencies, diagnose fault conditions if one or more units is not functional or show fault symptoms, and/or aggregate information for the whole complex.

Complex 801 may be a residential/office/commercial/industrial complex in which the electrical system is controlled by the circuit breaker panel 800a. In an embodiment, the complex 801 may include one or more rooms with one or more electrical devices/appliances or groups of appliances.

Power line 802 is the main power line from a power source that is external to the complex 801. In an embodiment, the power line 802 provides electric power to the electrical system in the complex 801.

Main circuit breaker 803 is a circuit breaker that takes the role as a master/main circuit breaker that controls slave circuit breakers in the circuit breaker panel 800a. In an embodiment, the main circuit breaker 803 may be included in the circuit breaker panel 800a, or may be external to the circuit breaker panel 800a. In at least one embodiment, the main circuit breaker 803 and all the slave circuit breakers have wired and/or wireless communication capability. In an embodiment of an electrical system topology with multiple circuit breakers in the circuit breaker panel 800a, a certain circuit breaker (e.g., the main circuit breaker 803 as shown in FIG. 8A) may take on the role of a master and other circuit breakers may have the roles of slaves that are controlled by the master. In an embodiment, the master assignment may be managed based on a Central Coordinator/CCo) selection mechanism as provided in the HomePlugAV/AV2 (IEEE 1901 and 1905.1 hybrid networking standards). In an embodiment, the EOP protocol as defined in the Appendix is used for determining the roles of the circuit breakers. In an embodiment, the master-slave role assignment establishes a top down hierarchy that can be centrally managed and helps prevent a situation in which a number of individual wireless (e.g., Wi-Fi) devices are competing for the common wireless resources. In an embodiment, the main circuit breaker 803 is responsible for provisioning the slaves and reporting the status of each slave. In case of failure of the main circuit breaker 803, one of the slaves automatically takes on the role of the master and maintains integrity of the network. In an embodiment, the master-slave relationship between circuit breakers can be enabled or disable as per user requirements. Communications between the master and slave circuit breakers will be discussed further in conjunction with FIGS. 9A and 9B.

Master Wi-Fi and EOP 804 include wireless and/or wired communication medium that are used for the main circuit breaker 803 to communicate with other circuit breakers in the circuit breaker panel 800a, and for the circuit breakers to communicate with sensing devices and/or safety devices, and for the user to monitor and/or control the electrical system in the complex 801.

Array panel 805 is a panel that includes an array of circuit breakers. In an embodiment, the array panel 805 includes a master circuit breaker and a number of slave circuit breakers. In another embodiment, the array panel 805 only includes a number of slave circuit breakers that are controlled by an external master circuit breaker. In an embodiment, the user can select their circuit breakers based on the installation of the array panel 805.

Circuit breakers 1-n 806a-n take on the role of slave circuit breakers and control different appliances or groups of appliances that may be in different rooms. In an embodiment, one or more of the circuit breakers 1-n 806a-n can control appliances in the same room. For example, the appliances in room 2 810b in FIG. 8A may be controlled by both circuit breaker 1 806a and circuit breaker 2 806b. In an embodiment, one circuit breaker can control appliances in different rooms. For example, in FIG. 8A the circuit breaker 1 806a controls appliances in room 1 801a and room 2 810b.

Communication bus 807 may be a wired or wireless communication bus that allows the circuit breakers 1-n 806a-n in the circuit breaker panel 805 to communicate with one another.

Power lines 808 and 809a-n are power lines that carry electrical power, controlled by the circuit breakers 1-n 806a-n, to devices/appliances in multiple rooms of the complex 801.

Rooms 1-N 810a-n include multiple rooms within the complex 801, separated by walls or other structures. In an embodiment, rooms 1-N 810a-n may include common appliances (e.g., lights). In an embodiment, devices/appliances in different rooms 1-N 810a-n may be different.

Power lines 811 include power lines that provide electric power to the appliances within room 1 810a.

Cooking range 812 may be an embodiment of the gas cooking range 602 or electric cooking range 702, which were discussed in conjunction with FIGS. 6 and 7, respectively. In an embodiment, the cooking range 812 is controlled by the circuit breaker 2 806b.

Smoke detector 814 may be an embodiment of the smoke detector discussed in conjunction with FIG. 3. In an embodiment, the smoke detector 814 detects smoke in room 2 810b and would send a wireless signal to the main circuit breaker 803 if smoke is detected. In an embodiment, the main circuit breaker 803 receives the signal from the smoke detector 814 and sends instructions to the circuit breaker 2 806b to shut off the cooking range 812.

Appliances 816 and 818 are devices/appliances in different rooms (e.g., room 3 810c, room N 810n). In an embodiment, appliances in different rooms are controlled by individual circuit breakers. For example, the appliance 816 in room 3 810c is controlled by the circuit breaker 3 806c, while the appliance 818 in room N 810n is controlled by the circuit breaker n 806n.

Figure 8B:
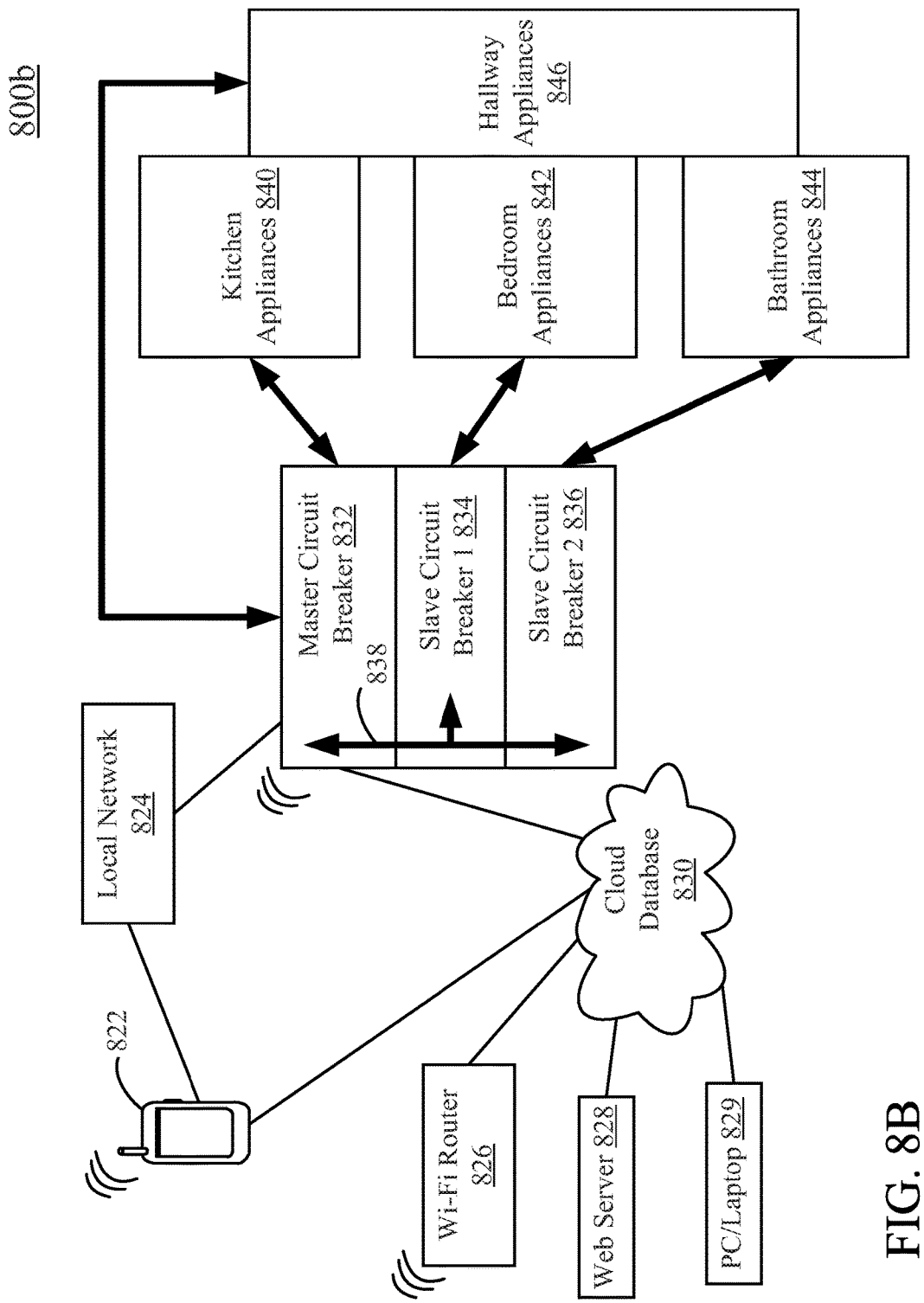
FIG. 8B shows a diagram of an embodiment of the circuit breaker panel that communicates with a user device.

FIG. 8B shows a diagram of an embodiment of a circuit breaker panel 800b that communicates with a user device.

The diagram of FIG. 8B shows at least a user device 822, local network 824, a Wi-Fi router 826, a web server 828, PC/laptop 829, a cloud database 830, a master circuit breaker 832, slave circuit breaker 1 834, slave circuit breaker 2 836, a communication bus 838, kitchen appliances 840, bedroom appliances 842, bathroom appliances 844, and hallway appliances 846. In other embodiments, FIG. 8B may not include all of the components listed and/or may include other components in addition to or instead of those listed above.

FIG. 8B shows that the circuit breaker panel 800b may communicate with the user device via clout and/or local network. In at least one embodiment, the circuit breaker panel 800b may send data including current, voltage, power, room information, device details, power usage, status of each appliance/device to the cloud database or local network, so that the user can monitor and control remotely using a wireless user device through cloud or local network. The abovementioned system provides the user with better safety, status, diagnostics and control over appliance and load on his/her electrical network. In an embodiment, the data regarding the user's home can be compared with data of other homes, and detail usage and/or power saving information may be provided to users. In an embodiment, the data can be shared to a power utility company to help save power across country. In an embodiment, the data can be used by insurance companies, security companies, and/or appliance manufactures, for example.

User device 822 may be an embodiment of the user device 412 that was discussed in conjunction with FIG. 4. In an embodiment, the user device 822 includes a wireless module and can communicate with the circuit breaker panel 800b via cloud and/or local network.

Local network 824 is a network that interconnects computers within a limited area such as a residence, school, laboratory, or office building. In an embodiment, the user device 822 is connected to the local network 824 to communicate with the breaker circuit panel 800b.

Wi-Fi router 826 is a networking device that forwards data packets between computer networks and serves as a wireless access point to provide access for the user device 822 to connect to the cloud database and/or Internet.

Web server 828 is connected to the cloud and provides web pages to the user device 822. In an embodiment, the web server 828 provides web pages showing individual user's status information about the electrical system at the user's home.

PC/laptop 829 may be a personal computer or a laptop computer that is used by a user to access the network to monitor and/or control the circuit breaker panel 800b.

Cloud database 830 is a database that typically runs on a cloud computing platform. In an embodiment, the cloud database 830 stores status information regarding the electrical system, which is received from the breaker circuit panel 800b, so that the user device 822, PC/laptop 829, and/or web server 828 may retrieve information from the clout database 830.

Master circuit breaker 832 takes on the role of a master and monitors and controls the slave circuit breakers, and communicates with the user device 822. In an embodiment, the master circuit breaker 832 controls the power supply to the devices in the kitchen and/or in the hallway. In an embodiment, the master circuit breaker 832 includes both a wireless (e.g., Wi-Fi) module and a power line communication module (e.g., EOP).

Slave circuit breaker 1 834 controls the power supply to the devices in the bedroom. In an embodiment, the slave circuit breaker 1 834 includes EOP for inter-circuit breaker communication.

Slave circuit breaker 2 836 controls the power supply to the devices in the bathroom. In an embodiment, the slave circuit breaker 2 836 includes EOP and optional Wi-Fi communication.

Communication bus 838 may be an embodiment of the communication bus 807 that was discussed in conjunction with FIG. 8A.

Kitchen appliances 840 may include cooking range, stove, microwave, toaster, oven, lights, motors for drain, mixer, fridge, for example.

Bedroom appliances 842 may include lights, fan, cooling system, hair dryer, hair straighter, television, phones, laptops, cell phones, video games, battery charger, for example.

Bathroom appliances 844 may include lights, hot water to shower, motors for shaver, exhauster fan, for example.

Hallway appliances 846 may include lights and fans, for example.

Figure 9A:
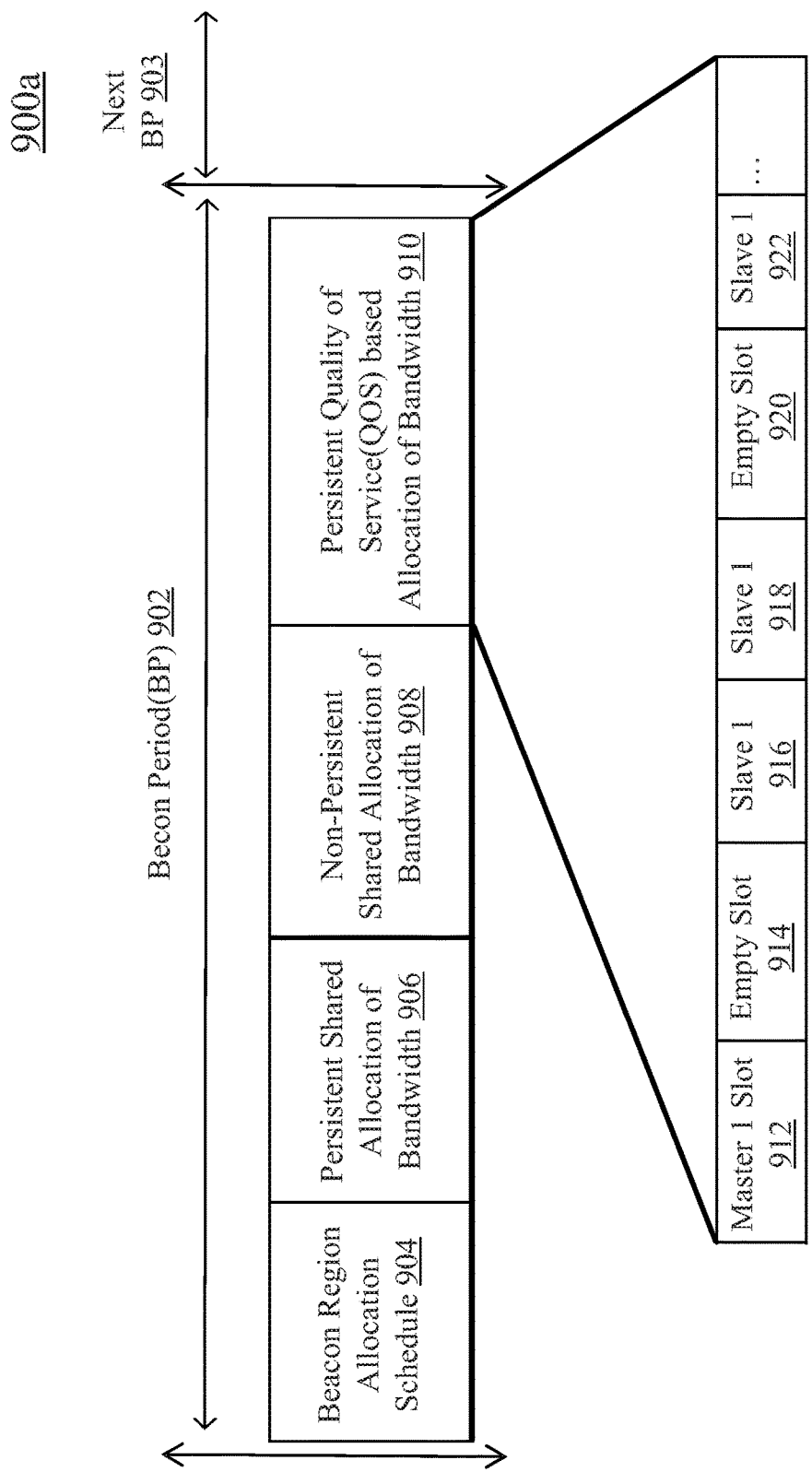
FIGS. 9A and 9B show diagrams of an embodiment of master-slave timing scheduling.
Figure 9B:
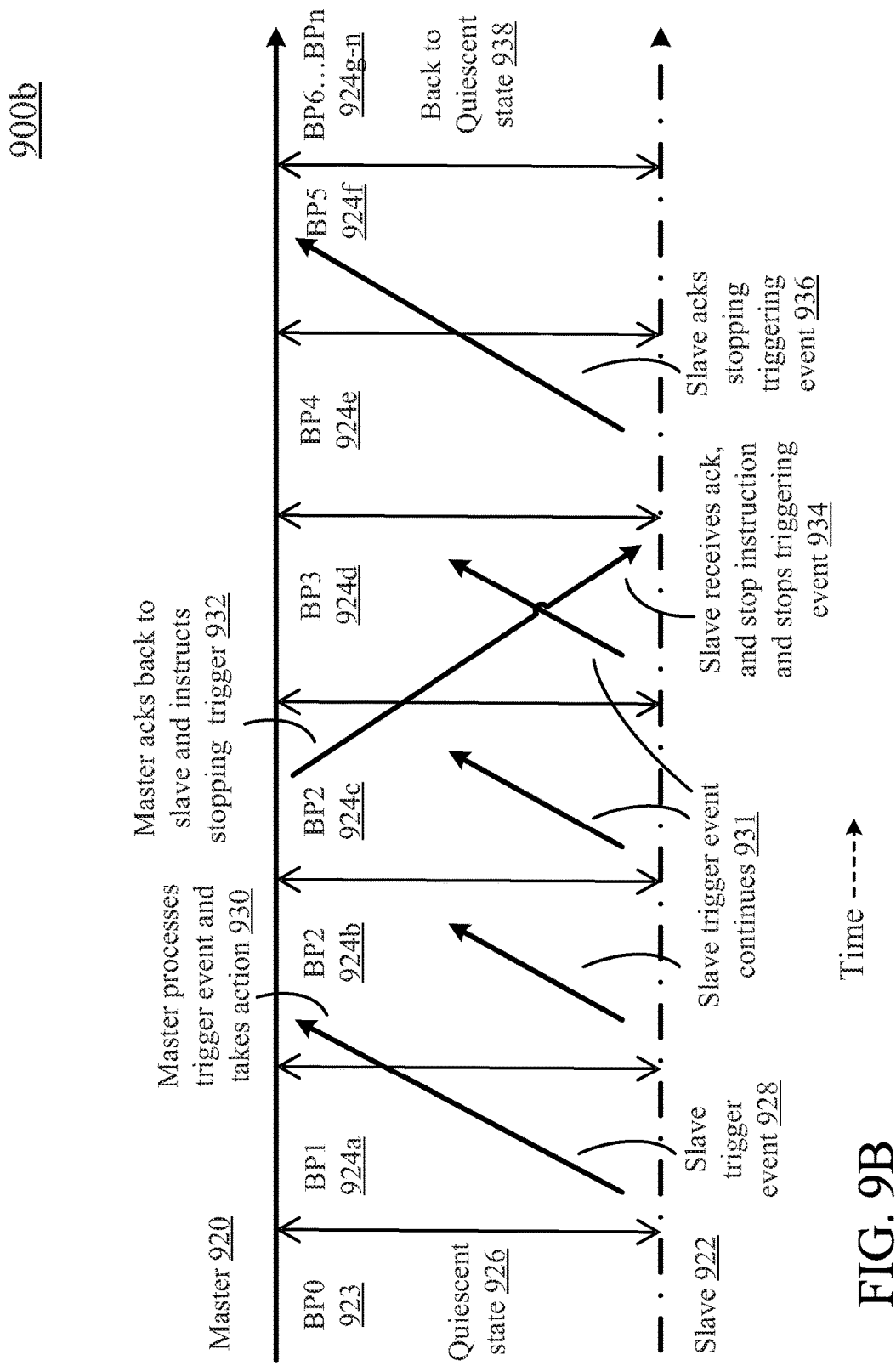

FIGS. 9A and 9B show diagrams of an embodiment of master-slave timing scheduling 900a. The timing schedule 900a includes at least beacon period (BP) 902 and next BP 903, beacon region allocation schedule 904, persistent shared allocation of bandwidth 906, non-persistent shared allocation of bandwidth 908, persistent quality of service (QOS) based allocation of bandwidth 910, master 1 slot 912, empty slots 913 and 916, and slave 1 slots 914, 915, and 917. In other embodiments, the timing schedule 900a may not include all of the components listed and/or may include other components in addition to or instead of those listed above.

FIG. 9A shows an embodiment of the master-slave timing scheduling 900a. In at least one embodiment, different time periods are reserved for different types of communications. In at least one embodiment, the communication between the master and the slaves may be based on a contention free allocation zone that is established using beacon period and a schedule. The master may broadcast the beacon at the beginning of each beacon period to communicate the scheduling within the beacon period. The schedule advertised by the beacon is persistent, and needs to be maintained over multiple beacon periods, which allows for continuity in the communication timing, such that the master-slave communication has high reliability and allows for retransmission of alert notifications if acknowledgments from either the master or slave are not received.

Beacon period (BP) 902 shows the time interval during which data is transmitted by the beacon. In an embodiment, the beacon period indicates the frequency interval of the beacon. In an embodiment, BP 902 shows one interval of data transmission, while next BP 903 shows next interval of data transmission.

Beacon region allocation schedule 904 schedules the allocation of bandwidth among different beacon regions. Beacon region allocation schedule 904 indicates how bandwidth and different time intervals within BP 902 will be allocated. The concept of a "Beacon" and "Beacon Region" are based the HomePlugAV white paper_050818.pdf section Mac Protocol/Services on Page 5. The protocol associated with the beacon is packet-based, and is used to establish communications between different devices that transmit and receive information on a wired media (e.g., a copper or aluminum wire). The beacon period is a fixed time slot. The time period after which a beacon repeats is called a beacon period. In the Homeplug AV standard, for stability reasons the beacon period is synchronized to AC line cycle (for example 60 Hz in the US, which means the time period or interval of a beacon period is 1/60 s=0.01666 s). The beacon period is the time period that is divided into different regions. The very first region in the slot is called a "Beacon region." In this slot a "Beacon" packet that carries the information about how the total time slot of the beacon period is to be divided among the devices that need to use the media. The allocation of the timeslot to a particular device is called allocation schedule and is referred to as "Beacon region allocation schedule" The reference to the persistent shared allocation is because beacons cannot change an allocation from one beacon period to the next. There is a minimum number of beacon periods that will carry the same allocation. Keeping the same timeslot allocated to the same device allows devices that may have missed one or more beacon regions to still be able to transmit data without having to determine whether the timeslot allocated to that device may have been allocated to another device during a subsequent beacon period.

Persistent shared allocation of bandwidth 906 is a period of time during which the bandwidth is divided between the various functions and types of operations that are performed repeatedly by the system, and the persistent shared allocation of bandwidth 906 may be maintained over multiple beacon periods.

Non-persistent shared allocation of bandwidth 908 is a time period during which operations/messages are performed/transmitted that are nonstandard and therefore not repeated during each BP 902, and the allocation of bandwidth 906 may be change over beacon periods.

Persistent quality of service (QOS) based allocation of bandwidth 910 includes persistent allocation of bandwidth by the beacon that is based on the quality of service. For example, the bandwidth for a master circuit breaker having higher quality of service may be larger than the bandwidth for slave circuit breakers. During the same "Beacon period" mentioned above, there is a region called the Persistent Allocation for QOS session. The reason for the Persistent Allocation for QOS session is to facilitate operations having a Fixed Latency (for example an emergency shutoff that needs to be achieved within a fixed period of time, error free service between a master and a particular slave). The Persistent Allocation for QOS session region allows for guaranteed bandwidth for larger data transfers without collisions. Collision-free data transfer is desirable when all the slave circuit breakers send their data to the Master. The collision free data transfer allows the master to receive the data from the slaves error free and with consistency (or with significantly fewer errors and with greater consistency than were collisions allowed).

Master 1 slot 912 is a slot allocated for the master circuit breaker to transmit data.

Empty slot 913 and 916 are slots in which no circuit breaker transmits data.

Slave 1 slots 914, 915, and 917 are slots allocated for the slave circuit breaker 1 to transmit data.

In an embodiment, one time slot is reserved for the master to send messages and another is reserved for the slaves to send messages. If an event occurs during the wrong timeslot, the slave that is affected by the event waits to communicate information about the event until the time slot set aside for slave communications. The master has a large bandwidth set aside for the master, so that the master can send messages and sort out conflicts (if there are any). In an embodiment, the slaves do not communicate with each other directly, but instead the slaves send messages to the master, and the master coordinates the activities of the slaves. Each slave however may only be allocated a small bandwidth for communications.

In an embodiment, usage may be based on the beacon and dedicated time slots may be based on existing standards.

FIG. 9B shows an embodiment of the communication 900b between master circuit breaker and slave circuit breaker using the time scheduling 900a. The communication 900b includes at least master 920, slave 922, BP0 923, BP1-n 924a-n, quiescent state 926, slave trigger event in step 928, master processes trigger event and takes action in step 930, slave trigger event continues in step 931, master acknowledges back to slave and instructs stopping trigger in step 932, slave receives acknowledgement and stop instructions and stops triggering event in step 934, slave acknowledges stopping triggering event in step 936, and back to quiescent state in step 938. In other embodiments, the timing schedule 900b may not include all of the components listed and/or may include other components in addition to or instead of those listed above.

FIG. 9B shows an embodiment of master-slave communication 900b over multiple beacon periods for typical trigger after the beacon schedules are established.

Master 920 and slave 922 may be embodiments of the main circuit breaker 803 or master circuit breaker 832, and circuit breakers 1-n 806a-n or slave circuit breaker 1 834 and slave circuit breaker 2 836, which were discussed in conjunction with FIGS. 8A and 8B, respectively.

BP0 923 and BP1-n 924a-n are embodiments of beacon period(s) 902/903 that were discussed in conjunction with FIG. 9A. In an embodiment, in each beacon period, the master 902 and slave 922 are allocated with different slots for sending signals.

Quiescent state 926 is a normal operation state of the system, when there is no slave triggering event.

In step 928, the slave 922 triggers an event and sends the signal, in BP 1 924a, to the master 920.

In step 930, the master 920 receives the signal and processes trigger event and takes action.

In step 931, the slave 922 continues triggering event, over multiple beacon periods (e.g., BP 2 924b and 924c, and BP3 924d).

In step 932, the master 920 acknowledges back, in BP 2 924c, to the slave 922 and instructs the slave 922 to stop trigger.

In step 934, the slave 922 receives, in BP 3 924d, acknowledgement and stop instructions and stops triggering event.

In step 936, the slave 922 acknowledges, in BP 4 924e, to the master 920 that triggering event is stopped.

In step 938, the system is back in normal operation (e.g., returning to the quiescent state).

Figure 10:
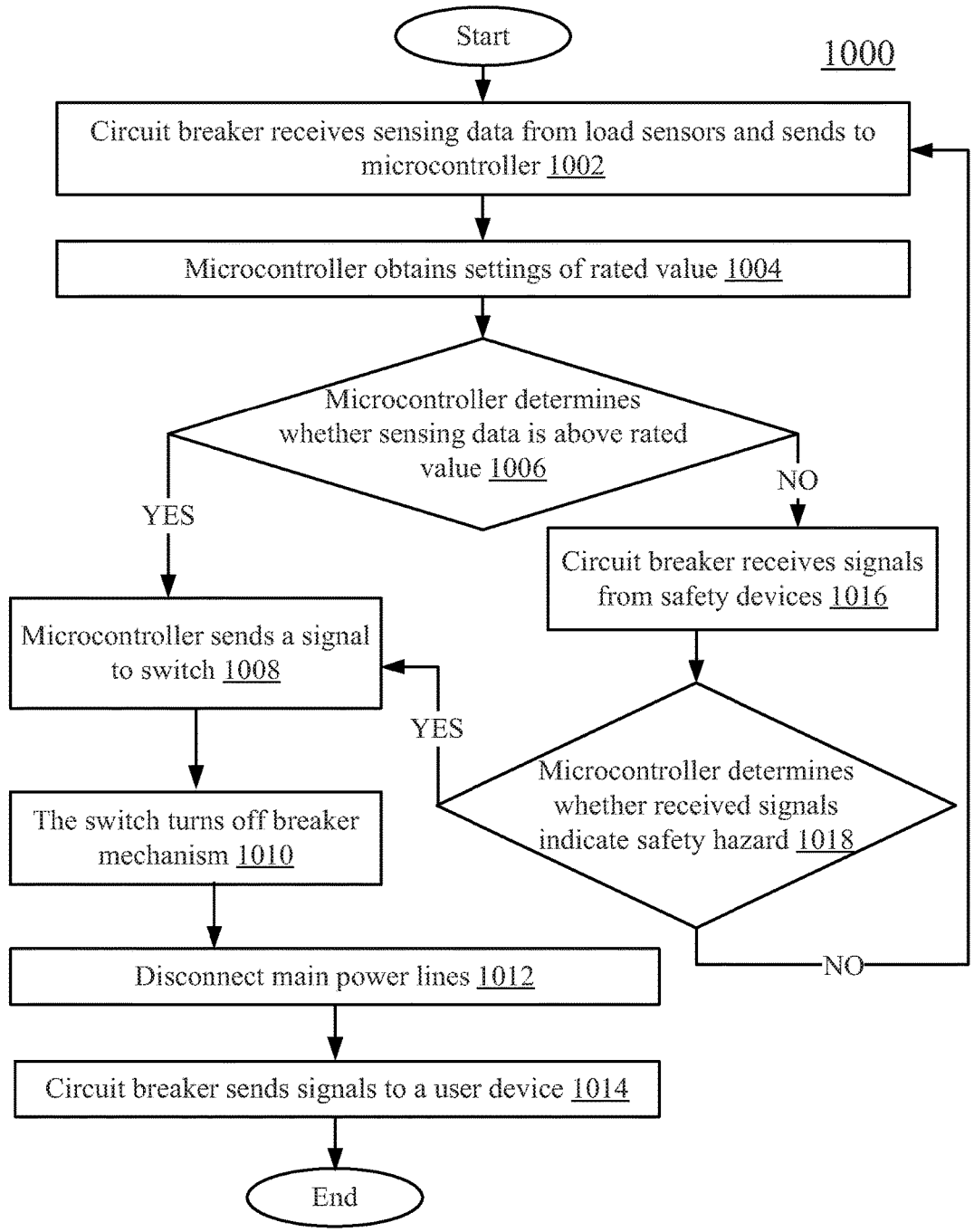
FIG. 10 shows a flowchart of an embodiment of a method of using the circuit breaker to control the power lines.

FIG. 10 shows a flowchart of an embodiment of a method 1000 of implementing the circuit breaker.

In step 1002, the circuit breaker receives sensing data from load sensors and transmits to the microcontroller. Optionally, the sensing data is converted from analog signals to digital signals by an ADC before the data is transmitted to the microcontroller.

In step 1004, the microcontroller obtains settings of rated value/range. The settings may be one-time settings that are hardwired by the manufacturer, or the settings may be programmed and set by a user.

In step 1006, the microcontroller compares the received sensing data with the rated value/range and determines whether the sensing data is outside of (e.g., above) the rated value. If the sensing data is outside of the rated value/range, a fault condition (e.g., overcurrent) is determined to be detected, and the method 1000 proceeds to step 1008. If the sensing data is within the rated value/range, the method 1000 proceeds to step 1016.

In step 1008, in response to the detection of the fault condition, the microcontroller sends a signal to the switch to actuate the switch.

In step 1010, the switch, when actuated, turns off the breaker mechanism.

In step 1012, as a result of the step 1010, the main power lines are disconnected.

In step 1014, the circuit breaker sends signals or messages to the user device to inform the user, so that the user may monitor and control the system.

In step 1016, the circuit breaker receives signals from safety devices (e.g., smoke/$CO_2$/fire detectors). Optionally as part of the step 1016, the circuit breaker receives signals from other sensors that may detect ground fault and/or arc fault.

In step 1018, the microcontroller determines whether the signals received indicate safety hazard. If the signals indicate safety hazard, the method proceeds to the step 1008 in which the microcontroller sends a signal to actuate the switch. If the signals does not indicate safety hazard, the method 1000 may repeat steps 1002-1018 to continue monitoring and controlling the system.

In an embodiment, each of the steps of method 1000 is a distinct step. In at least one embodiment, although depicted as distinct steps in FIG. 10, steps 1002-1018 may not be distinct steps. In other embodiments, method 1000 may not have all of the above steps and/or may have other steps in addition to or instead of those listed above. The steps of method 1000 may be performed in another order. Subsets of the steps listed above as part of method 1000 may be used to form their own method.

Figure 11:
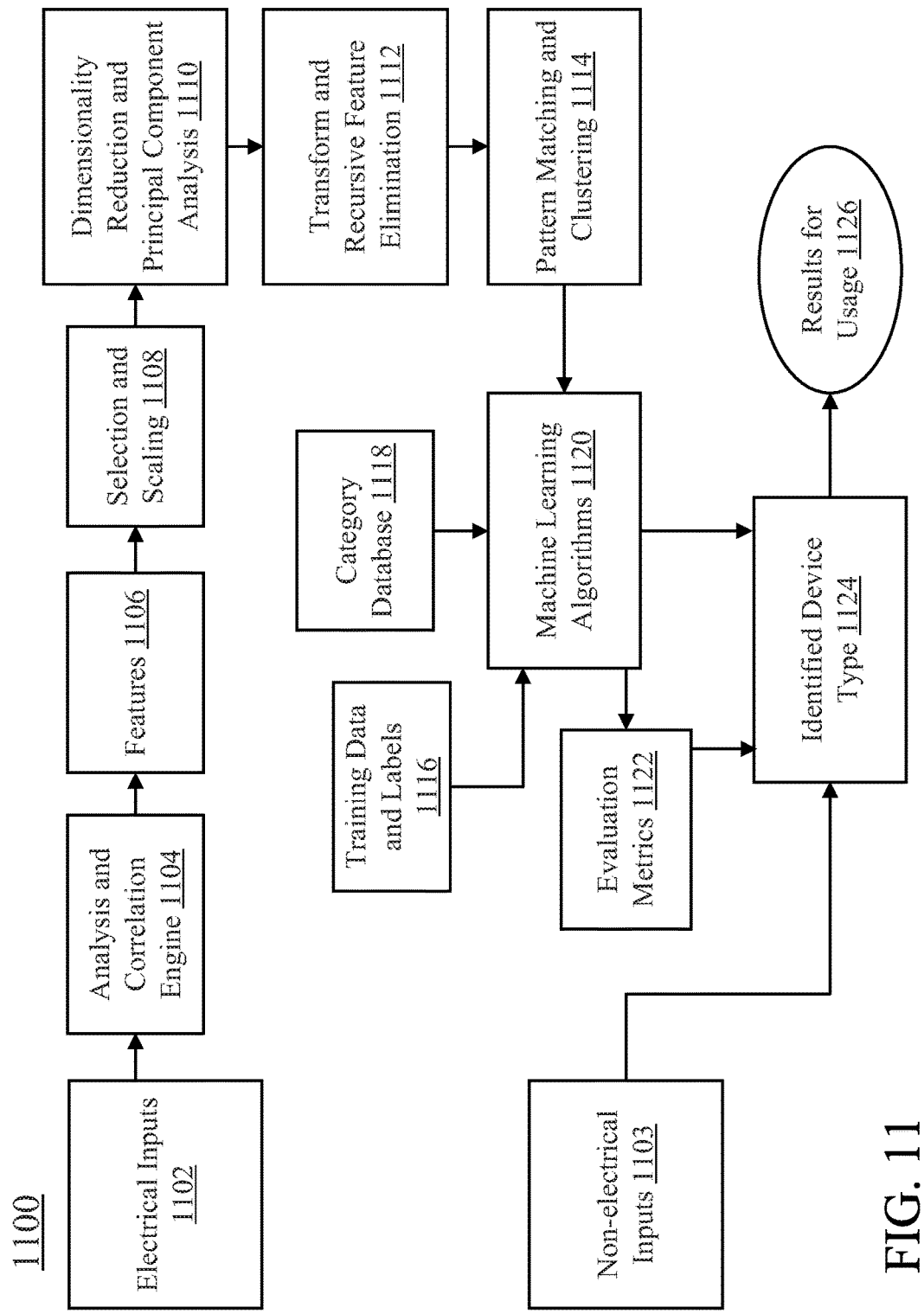
FIG. 11 shows a flow diagram of an embodiment of a method of identifying electronic appliances in an electrical system controlled by the circuit breakers.

FIG. 11 shows a flow diagram of an embodiment of a system 1100 of identifying electronic appliances in the circuit breaker system.

To accurately detect devices/appliances, an advanced algorithm may get trained with several components as input. The inputs to the advanced algorithms may include, but are not limited to, room information (e.g., a room can be easily identified from breaker unit), current, voltage, power consumption, instantaneous voltage/current, in-surge current, apparent and/or reactive power, power factor, current and voltage variation based on devices/appliances, frequency components, Internet Of Thing (IOT) enabled devices, user inputs, bar code scanning, picture comparison/pattern recognition, electro-magnetic interference, spread spectrum analysis, noise, wireless signals, reflections and termination, wiring blue prints, web based search, device behavioral analysis, training, crowd sourcing, preprogrammed/programmable RFID. In an embodiment, the advanced algorithm may also detect station movement (e.g., if a device/appliance is moved from one room to another room), and will pin point the user that the device has been moved from room A to room B.

In at least one embodiment, electrical and electronic devices/appliances, when in operation, cause characteristic variation in the measurable electrical parameters, which variations in transient and steady state can be used to categorize and identify the devices/appliances. A set of input electrical parameter/sources that can be used for identifying the devices are listed in Table 1.

TABLE 1

| Electrical Parameter Sources | Current |
|---|---|
| | Voltage |
| | Power |
| | Frequency |
| | In surge current |
| | Transients |
| | Spread Spectrum distribution |
| | Electromagnetic Interference |
| | Noise Signatures |
| | Wireless signals |
| | Reflections and terminations |
| | Blueprints |
| | Time-domain reflectometry(TDR) |
| | Time-domain transiometry(TDT) |
| | Spread Spectrum Time-domain reflectometry(SSTDR) |

In at least one embodiment, the parameters listed in Table 1 can be analyzed using digital signal processing techniques, pattern matching, and/or feature mapping to build a database of specific characteristics for each category of devices. Using the specific characteristics in the database, machine learning algorithms can be trained to identify other devices that fall into the same category.

In another embodiment, other than the electrical parameters listed in Table 1, device identification can also be accomplished using input from other input sources that are listed in Table 2.

TABLE 2

| Non-Electrical Parameter Sources | User Input |
|---|---|
| | Product/Bar Code |
| | Web Based Search |
| | Wired/Wireless discovery |
| | Training |
| | Crowd sourcing |
| | Preprogrammed/Programmable RFID |
| | Device Behavioral analysis |

In at least one embodiment, using the combination of inputs from Table 1 and Table 2, a list of features may be derived, processed, and/or can be input to a set of steps (e.g., the steps in FIG. 11) that can then successfully identify a device in an electrical network with a certain degree of precision. The flowchart in FIG. 11 illustrates how the identification of devices can be achieved and how the precision of the results can be obtained.

Electrical inputs 1102 are the electrical inputs received by the circuit breakers, such as the frequency, voltages, and currents of the signals on different lines, and messages from different devices. The electrical inputs (e.g., inputs as listed in Table 1).

The circuit breaker system receives the electrical inputs of electrical inputs 1102. The circuit breaker system may also receive non-electrical inputs 1103 (e.g., inputs as listed in Table 2), which may be used to identify device type.

Analysis and correlation engine 1104 receives the electrical inputs and analyzes the electrical inputs and correlates the electrical inputs to various parameters, phenomena, and/or one another.

Analysis and correlation engine 1104 produces features 1106 based on the electrical inputs.

At selection and scaling 1108, the features of features 1106 are selected and scaled.

At dimensionality reduction and principle component analysis 1110, the dimensions of the features/inputs are reduced and principle components are analyzed.

At transform and recursive feature elimination 1112, transform and recursive features are eliminated.

At pattern matching and clustering 1114, patterns of the features are matched and clustered.

Data training and labels 1116 provides training data and labels are provided to the machine learning algorithms.

Category database 1118 is a database of specific characteristics for each category of devices provides input to the machine learning module. The category database 1118 provides category characteristics for the machine learning algorithms for identifying the devices. The parameters listed in the above tables can be then analyzed using digital signal processing techniques, pattern matching, feature mapping to build the category database 1118. The machine learning algorithms are trained to identify other devices that fall into the same category.

Machine learning algorithms 1120 analyze the patterns and/or features based on characteristics of different categories of devices. In an embodiment, the machine learning algorithms 1120 may determine the device type directly.

At evaluation metrics 1122, the patterns and/or features determined are evaluated and compared in an evaluation metrics to identify the device type.

At identify device types 1124, with benefit from evaluation metrics 1122, machine learning algorithms 1120, and non-electrical input 1103, the device type is identified.

Results for usage 1126 are the results of the identification, which are output to be used by the breaker system. Optionally the results are sent to the user device so that the user may monitor and/or control the devices.

In an embodiment, each of the steps of method 1100 is a distinct step. In at least one embodiment, although depicted as distinct steps in FIG. 11, steps 1102-1126 may not be distinct steps. In other embodiments, method 1100 may not have all of the above steps and/or may have other steps in addition to or instead of those listed above. The steps of method 1100 may be performed in another order. Subsets of the steps listed above as part of method 1100 may be used to form their own method.

Figure 12:
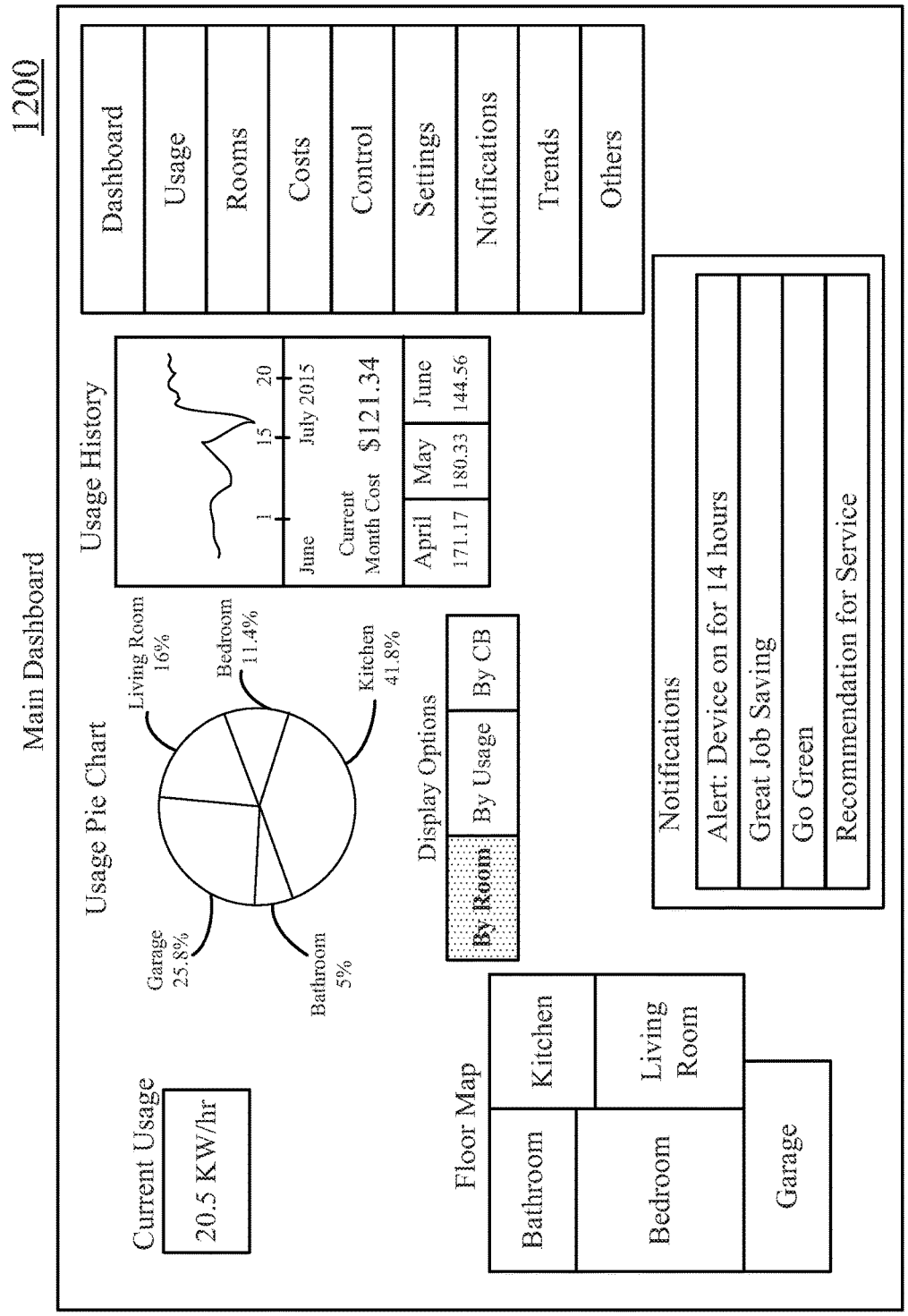
FIG. 12 shows a diagram of an embodiment of a dashboard that shows the status and information of an electrical system.

FIG. 12 shows a diagram of an embodiment of a dashboard 1200 that shows the status and information of an electrical system that is monitored and/or controlled by the abovementioned microcontroller.

ALTERNATIVES AND EXTENSIONS

Although the specification refers to a furnace, water boiler, and air conditioner, other environment and/or temperature control devices, such as a fan, heat pump, sump pump, vaporizer, humidifier, and/or dehumidifier may be substituted to obtain other embodiments.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A system comprising:
a microcontroller including at least one processor that implements one or more machine instructions stored on at least one non-transitory computer readable media;
at least one sensor that, when activated, monitors a status of an electrical system, the at least one sensor sending signals to the microcontroller indicating the status of the electrical system; and
an electrical switch that connects and disconnects the electrical system to a power source, the microcontroller controlling operation of the electrical switch based on the status of the electrical system;
the microcontroller being one of a plurality of microcontrollers, and the electrical switch being one of a plurality of electrical switches that connects and disconnects a plurality of electrical devices in the electrical system, the plurality of microcontrollers controlling the plurality of electrical switches, wherein the plurality of microcontrollers communicate with one another, wherein one of the plurality of microcontrollers receives signals from the at least one sensor and sends instructions, based on the signals received, to at least another of the plurality of microcontrollers to connect and disconnect at least one of the plurality of electrical devices; and
an interrupt mechanism for sending and receiving input that suspends the normal execution of at least one processor of at least one microcontroller of the plurality of microcontroller.

2. The system of claim 1, wherein the one or more machine instructions, when implemented, causes the at least one processor to establish a contention free allocation zone using beacon period and a schedule for the plurality of microcontrollers to communicate with one another.

3. The system of claim 1, wherein
the plurality of electrical switches including at least a circuit breaker configured to protect at least one electrical circuit from damage caused by an overload or short circuit, wherein the circuit breaker, when activated, detects fault conditions and when a fault condition is detected, interrupts current flow.

4. The system of claim 1, wherein the plurality of microcontrollers are configured to monitor a status of an electrical power system and control the plurality of electrical switches that turn off a breaker mechanism and therein disconnect one or more electrical loads from a power source.

5. The system of claim 1, comprising at least one current sensor that senses the current drawn by a downstream electrical load wherein when activated at least one microcontroller of the plurality of microcontrollers, in response to the current sensor sensing the current, compares the current sensed to a predetermined threshold to determine if the current sensed is higher than a rated value and if the current sensed is higher than the predetermined threshold, the at least one microcontroller sends a control signal to the switch to turn off the breaker mechanism, therein disconnecting the load from a power source therein protecting an appliance.

6. The system of claim 1, wherein
at least one electrical switch of the plurality of electrical switches controls a connection and disconnection of the power lines;
the at least one electrical switch includes a magnetic latch that is actuated by current flowing through a coil of the switch, causing a state change of a breaker mechanism.

7. The system of claim 1, further comprising
a programmable unit, via which settings of the system are received, and
a security module that controls access to programmable functions of the programmable unit to prevent unauthorized access.

8. The system of claim 1, further comprising a wireless module configured to implement wireless communications between at least one microcontroller and a wireless device.

9. The system of claim 1, further comprising a power backup module including at least a backup battery that supplies at least enough power to maintain at least some operations in case of a loss of power from a primary power source.

10. The system claim 1 wherein the at least one sensor an in communicatively coupled to the interrupt mechanism, the at least one sensor being capable of causing the input that suspends the normal execution of the at least one processor to be generated.

11. The system of claim 1 comprising,
a master circuit breaker and
one or more slave circuit breakers, which are controlled by the master circuit breaker.

12. The system of claim 1 comprising a smart climate control unit including at least a thermostat,
power outlets,
a power line,
a decoder and control circuitry,
a furnace,
air conditioner, and
a receiver/transmitter for a user device to communicate with the furnace and air conditioner.

13. The system of claim 1 comprising computer readable media storing a user application that provides a thermostat interface that displays readings received from a climate control unit.

14. The system of claim 1 comprising computer readable media storing a user application that provides a thermostat interface that includes an electronic page for setting and displaying time periods and settings that apply during the time periods.

15. The system of claim 1 comprising computer readable media storing a user application that provides a thermostat interface that includes an electronic page for setting and displaying the time periods and settings and displaying a temperature at which to set a smart climate control unit.

16. The system of claim 15, the user application including one or more machine instructions for accessing a temperature sensor in a user device and to send signals to a climate control unit based on user settings entered via the user application and readings from the temperature sensor in the user device.

17. The system of claim 1, further comprising a building in which the plurality of electrical devices reside.

* * * * *